United States Patent
Heinonen et al.

(10) Patent No.: US 7,574,174 B2
(45) Date of Patent: Aug. 11, 2009

(54) APPARATUS, METHOD AND SYSTEM FOR A REMOTE-PAGE DEVICE

(75) Inventors: Tomi Heinonen, Tampere (FI); Timo M. Laitinen, Tampere (FI); Tommy Ginman, Espoo (FI); Timo K. Perälä, Helsinki (FI)

(73) Assignee: Nokia Corporation, Espoo (FI)

( * ) Notice: Subject to any disclaimer, the term of this patent is extended or adjusted under 35 U.S.C. 154(b) by 558 days.

(21) Appl. No.: 10/192,873

(22) Filed: Jul. 10, 2002

(65) Prior Publication Data
US 2004/0009748 A1  Jan. 15, 2004

(51) Int. Cl.
H04B 7/00 (2006.01)
H04M 11/00 (2006.01)

(52) U.S. Cl. ............... 455/41.2; 455/41.3; 455/421

(58) Field of Classification Search ........... 455/41.2, 455/41.3, 458, 456.1, 456.2, 456.3, 456.6, 455/414.2, 421, 422.2, 426.1; 370/313; 340/426.21, 340/7.1, 7.2
See application file for complete search history.

(56) References Cited

U.S. PATENT DOCUMENTS

| | | | |
|---|---|---|---|
| 5,666,662 A | 9/1997 | Shibuya | |
| 5,850,186 A | 12/1998 | Min | |
| 6,301,230 B1 * | 10/2001 | Ito et al. | 370/313 |
| 6,504,503 B1 | 1/2003 | Saint-Hilaire et al. | |
| 6,587,034 B1 * | 7/2003 | Heiman et al. | 340/7.55 |
| 6,671,351 B2 * | 12/2003 | Menard et al. | 379/45 |
| 6,675,015 B1 * | 1/2004 | Martini et al. | 455/436 |
| 6,834,192 B1 * | 12/2004 | Watanabe et al. | 455/444 |
| 7,193,991 B2 * | 3/2007 | Melpignano et al. | 370/352 |

* cited by examiner

*Primary Examiner*—Eugene Yun
(74) *Attorney, Agent, or Firm*—Locke Lord Bissell & Liddell LLP

(57) ABSTRACT

An apparatus, method, and system for a remote-page devices. Communications are made more efficient with a connectivity tool. Remote-page enabled clients allow a short-range RF device to communicate beyond its coverage area or that of a nearby access point. Such a remote-page enabled client may issue remote-page messages and send them to remote-page enabled access points, which will ultimately route the message to a desired target client beyond the coverage area of the original client. The disclosure further teaches a remote-page enabled access point that may accept remote-page messages from clients and pass them on to remote access points that are communicating with the desired target device. The disclosure also teaches a remote-page server that tracks specified remote-page enabled access points and all clients disposed in communication with the access points. The remote-page server allows access points to query it for the existence of desired target devices and provides information relating to the existence of any such target devices. Information provided from a remote-page server to an access point allows the access point to establish a communications channel with a remote access point and act as a conduit for communications between an original client and a desired target client. This allows for client devices to not only communicate with devices outside of their given RF coverage area, but to also communicate across a communications network with other types of devices.

172 Claims, 12 Drawing Sheets

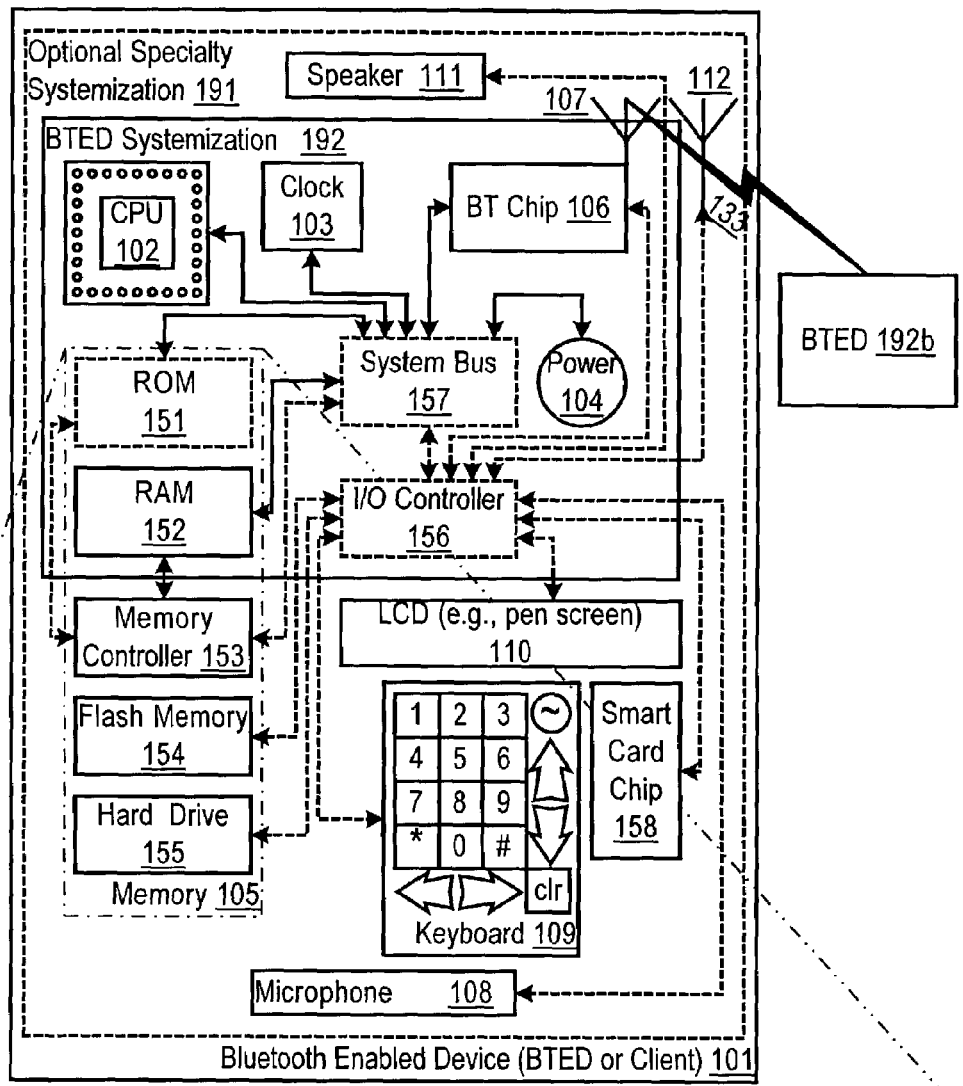
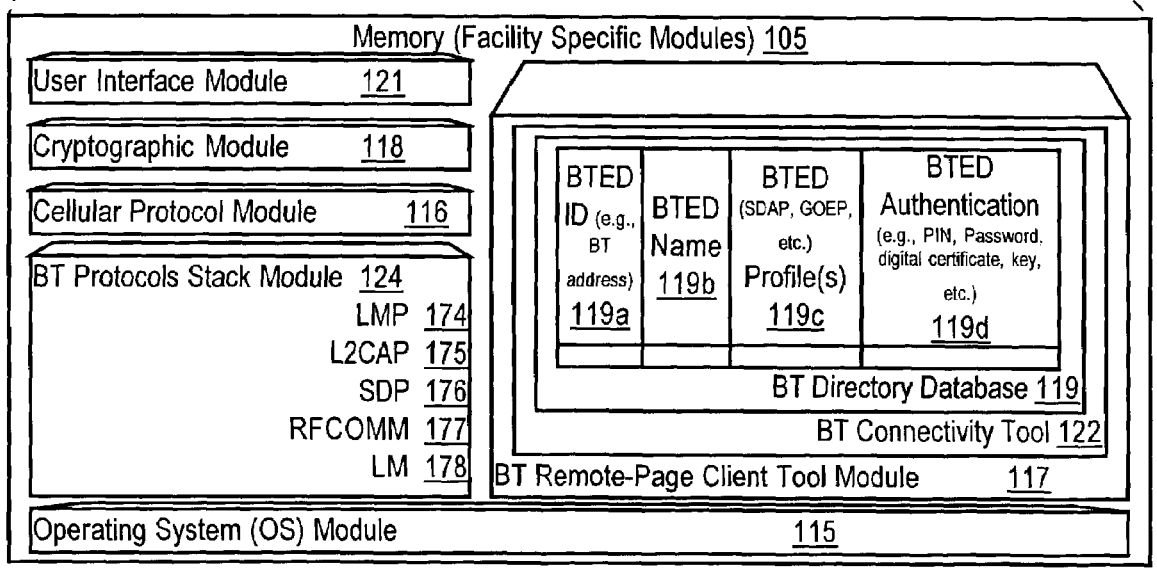
Figure 1

| Command | Definition |
|---|---|
| New Host Controller Interface (HCI) Command Structure ||
| Command | Definition |
| OCF | New Command Identifier for Remote page-Command |
| OGF | Command Group Identifer |
| BD-ADDR (6 bytes) | BT Address of the BAP           1301 |
| Pocket-Type (2 Bytes) | Pocket Size           1302 |
| Page_Scan_Repetition_Mode (1 Byte) | R0-R2           1303 |
| Page_Scan_Mode (1 Byte) | Optical Page Scan mode 1-111   1304 |
| Clock Offset | Difference between the Master and Slave Clock 1305 |
| Allow_Role_Switch (1 Byte) | Allow Role Switch?           1306 |
| Remote_BD_ADDR (6 Byte) | Remote Deice BT Address (e.g. T2 in previous figures)   1307 |

Figure 13

APPARATUS, METHOD AND SYSTEM FOR A REMOTE-PAGE DEVICE

RELATED APPLICATIONS

The instant application hereby claims priority to the following U.S. patent applications: (1) Ser. No. 10/097,226 for "Apparatus, Method and System for a Bluetooth Repeater" filed on Mar. 13, 2002; (2) Ser. No. 09/985,044 for "Customized Messenging Between Bluetooth Access Point And Services" filed on Nov. 1, 2001; and (3) co-pending for "An Apparatus, Method and System of a Connectivity Tool in Bluetooth Devices" filed on Jun. 14, 2002 in the name of Tomi Heinonen; each of these applications being herein incorporated by reference.

FIELD

The present invention relates generally to an apparatus, method and system to establish and route both communication and information between a wireless devices. More particularly, the disclosed invention relates to an apparatus, method and system to enable short-range radio frequency (RF) wireless point-to-point communications to known devices across a communications network.

BACKGROUND

Information Technology Systems

Typically, users, which may be people or other systems, engage information technology systems (e.g., commonly computers) to facilitate information processing. A computer operating system enables and facilitates users to access and operate computer information technology and resources. Common resources employed in information technology systems include input and output mechanisms through which data may pass, memory storage into which data may be saved, and processors by which information may be processed. Often information technology systems are used to collect data for later retrieval, analysis, and manipulation, which often is facilitated through database software. Information technology systems provide interfaces that allow users to access and operate various system components.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System or Microsoft's Windows provide a baseline and means of accessing and displaying information.

Networks

Networks are commonly thought to consist of the interconnection and interoperation of clients, servers, and intermediary nodes in a graph topology. It should be noted that the term "server" as used herein refers generally to a computer, other device, software, or combination thereof that processes and responds to the requests of remote users across a communications network. Servers serve their information to requesting "clients." A computer, other device, software, or combination thereof that facilitates, processes information and requests, and/or furthers the passage of information from a source user to a destination user is commonly referred to as a "node." Networks are generally thought to facilitate the transfer of information from source points to destinations. There are many forms of networks such as Local Area Networks (LANs), Wide Area Networks (WANs), Pico networks, etc.

Bluetooth (BT) Protocol

Bluetooth is a wireless technology that operates in the unlicensed Industrial, Scientific, and Medical (ISM) radio band of 2.4 GHz. Bluetooth technology includes a number of protocols that allow Bluetooth enabled devices to operate in a peer-to-peer environment forming piconets.

The Bluetooth protocol and specification may be found in: Bluetooth system; Specification Volumes 1 and 2, Core and Profiles: Version 1.1, 22 Feb. 2001.

SUMMARY

One embodiment of the present disclosure solves the problem of allowing Bluetooth enabled devices to communicate beyond their coverage area and that of any nearby Bluetooth access points. Furthermore, one embodiment of the present disclosure solves the problem allowing short-range RF enabled clients, such as Bluetooth enabled clients, to communicate over a communications network, such as the Internet. Such abilities are useful and more efficient than previous offerings because they allow communications to commence between devices without requiring an initiating device to make repeated communication device inquiries and without requiring the client device to employ complicated hardware and/or software to enable remote communications.

One non-limiting example embodiment taught by the instant disclosure is an apparatus, method, and system for a database that correlates Bluetooth devices. The Bluetooth directory database can be stored on Bluetooth devices. The Bluetooth directory database accelerates, facilitates, and simplifies communications. Communications are made more efficient by using and correlating Bluetooth addresses of various devices together with other device identifiers, e.g., clear textual representations (cleartext), in the Bluetooth directory database within a device.

In one non-limiting example embodiment of the the disclosure teaches an apparatus for wireless communication between Bluetooth devices. The apparatus is comprised of: a memory, where the memory is used for storing instructions; and a processor that may issue a plurality of processing instructions stored in the memory. The instructions issue signals to: invoke a selection list of known devices; retrieve known devices from a device descriptive database; provide the selection list of known devices, wherein items in the selection list of known devices may be selected, wherein the list of known devices is populated with known devices retrieved from the device descriptive database; accept a selection of a representation of a desired target device from the list; and send a signal to establish a communication connection with the desired target device, wherein the sent establishing signal may effect a response from the desired target device.

The above advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The accompanying drawings illustrate certain non-limiting example embodiments of the disclosure.

FIG. 1 illustrates a schematic overview of one non-limiting example embodiment of a Bluetooth enabled device 101;

FIG. 13 illustrates a structural diagram of one non-limiting example embodiment of a remote-page command;

DETAILED DESCRIPTION

Figure 2:
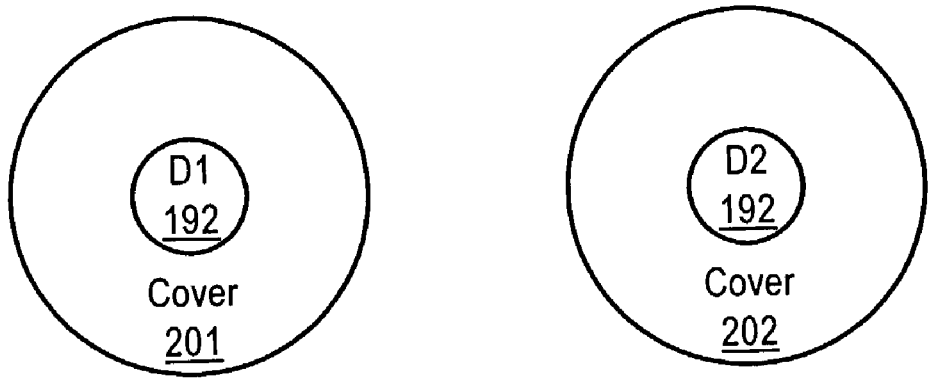
FIG. 2 is a block diagram of two out of range Bluetooth transceiver enabled devices.

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Bluetooth Enabled Client Terminal Device

FIG. 1 illustrates a schematic overview of one non-limiting example embodiment of a short-range, radio frequency (RF), Bluetooth enabled, client-terminal device ("client," "terminal" or "Bluetooth device") 101. The Bluetooth enabled device 101 is comprised of a Bluetooth enabled device systemization 192 and optionally with a specialty systemization 191. Optional items are marked by dotted lines, while dash-dot lines show greater detail within the item. The Bluetooth enabled device systemization 192 may be comprised of a: clock 103, central processing unit (CPU) 102, a memory 105, a power source 104, a Bluetooth chip 106 and transceiver 107. Optionally the Bluetooth enabled device systemization 192 may further be comprised of a system bus 152 and input and output (I/O) controller 156.

The optional specialty systemization 191 may be comprised of a: various extended forms 151, 153, 154, 155 of memory 105, input 108, 109, 110, output 110, 111, communication 112, 158, and Bluetooth enabled device systemization 192 components. Regardless of any actual configuration, as long as a client is enabled with a Bluetooth enabled device systemization 192 and a Bluetooth connectivity tool 117, which will be discussed in greater detail below, then the client 101 may accelerate and simplify Bluetooth protocol communications when communicating with other Bluetooth enabled devices.

Component Detail

Conventionally, although not necessarily, the client components are all interconnect and/or communicating through a system bus 157. In one non-limiting example embodiment of the Bluetooth enabled device systemization 192, the system bus 157 is communicatively and electrically interconnected, i.e., connected, with the CPU 102, clock 103, Bluetooth chip 106, power source 104, and memory 105. In an alternative embodiment an I/O controller 156 may be similarly connected into the system bus 157 and the Bluetooth chip 106 is connected into the I/O controller 156 instead of the system bus.

The power source 104 provides power to the client 101. The system clock 103 typically has a crystal oscillator and provides a base signal. The clock is typically coupled to the system bus and various means that will increase or decrease the base operating frequency for other components interconnected in the client. The clock and various components in the client drive signals embodying information throughout the client. Such transmission and reception of signals embodying information throughout the client may be commonly referred to as communications. These communicative signals may further be transmitted, received, and the cause of return and/or reply signal communications beyond the instant client to: communications networks, input devices, computer systems (e.g., servers), bridges, other clients, peripheral devices, repeaters, and/or the like.

Any of the client components may be connected directly to one another, connected to the CPU, and/or organized in numerous variations; examples of such variations may be found in various wireless and short range RF enabled devices (without a Bluetooth connectivity tool) such as, but not limited to: cellular telephones, Portable Digital Assistants (PDAs), laptop computers, peripheral devices, and/or the like. Optionally, the client may include various input/output devices, which are also disposed in communication with the CPU through the system bus and/or directly. Such input devices may include a microphone 108, an input keypad 109, a touch sensitive screen 110, and/or like. Output devices may include a (liquid crystal) display (LCD) 110, a speaker 111, a CRT (not shown), a printing element (not shown), and/or the like.

One of the I/O components is a Bluetooth chip 106 such as Cambridge Silicon Radio Inc.'s BlueCore IC and Bluetooth transceiver 107 capable of transmitting and receiving Bluetooth protocol communications (Bluetooth transceiver), wherein the Bluetooth transceiver 107 is connected to the Bluetooth chip 106. It is to be understood that the use of Bluetooth components/protocols in the exemplary embodiment is intended to be illustrative rather than limiting. Optionally, the client may also employ other wireless protocol transceivers 112 such as those employed for cellular telecommunications. Furthermore, a smartcard chip 158 may be employed to allow for unique identification of the client and may be used to enhance commercial transactions. The smartcard chip 158 may be provided by a number of smartcard providers in a single integrated circuit or component based format such as, but not limited to Gemplus SA's line of products (e.g., Chipware microcontroller integrated circuit, GemClub Micro, GemXpresso 211/V2, and/or the like).

CPU

The CPU 102 comprises at least one data processor adequate to execute program modules for executing user and/or system-generated requests. The CPU may be a microprocessor such as ARM's StrongARM, Intel's Pentium, Motorola's Dragonball, and/or the like. The CPU interacts with memory through signal passing through electrically connected, conductive conduits to execute stored program instruction signals according to conventional data processing techniques. Such signal passing facilitates communication within the communication networks and beyond through various interfaces.

Memory

It is to be understood that the client may employ various forms of memory 105. In a typical Bluetooth enabled device systemization 192 configuration, memory 105 may include random access memory (RAM) 152 and optionally read only memory (ROM) 151. Optional specialty systemizations 191 may include any number of memory formats such as, but not limited to: flash memory 154, fixed storage devices, e.g., a hard disk drive 155, and/or the like. In one non-limiting example embodiment, the various system memory formats 151, 152 are connected to a memory controller 153 instead of to the system bus 157, and the memory controller is connected to the system bus 157. In another example embodiment, various peripheral memory formats 154, 155 are connected to an I/O controller 156 instead of to the system bus 157, and the I/O controller is connected to the system bus 157.

Also, the Bluetooth chip 106 may contain various Bluetooth protocols within its own memory that may be provided to either the CPU 102 and/or memory 105; similarly, the smartcard chip 158 may also provide its own memory. Generally, any mechanization and/or embodiment allowing a processor to affect the storage and/or retrieval of information is regarded as memory 105. Thus, a client 101 generally requires and makes use of memory. However, memory is a fungible technology and resource, thus, any number of memory embodiments may be employed in lieu of or in concert with one another Module Collection The memory 105 may contain a collection of program modules and/or data such as, but not limited to: an operating system 115; Bluetooth communication protocol including a Bluetooth protocol stack 124; cellular communication protocols (if any) 116; cryptographic module 118, user interface 121; Bluetooth connectivity tool 122; Remote-page tool 117; Bluetooth directory database 119; and other short range radio frequency protocols (if any); and/or the like. Program modules are simply stored and/or fixed instruction signals, which when passed through a CPU 102 are executed. Similarly, data signals are also stored and/or fixed signals representing various data sets, which may be passed through client 101 components for processing and/or execution. It is understood that throughout this disclosure that instruction signals also encompass data signals. Software modules such as those in the module collection, typically and preferably, are stored in memory 105, they may also be loaded and/or stored in memory such as: peripheral devices, ROM, remote storage facilities through a communications network, various forms of memory, and/or the like.

Operating System

The operating system 115 is comprised of stored instruction signals executable by the CPU that facilitates the operation of the client. Typically, the operating system facilitates access of I/O, network interfaces, peripheral devices, storage devices, and/or the like. The operating system also may provide user interface functionality allowing the user to interact with the client. Example client operating systems include: Java based environments, Linux, Microsoft Pocket PC, Palm OS, various proprietary cell phone operating systems, and/or the like. An operating system may communicate to and/or with other modules in a module collection, including itself, and/or facilities of the like. Conventionally, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. Preferably, the operating system provides communications protocols that allow the client to communicate with other entities through a communications network. Various communication protocols may be used by the client as a subcarrier transport mechanism for interacting with other short range RF enabled devices, such as, but not limited to: TCP/IP, Bluetooth (e.g., via RFCOMM), OBEX, and/or the like. However, only Bluetooth protocol is required to work in conjunction with a Bluetooth connectivity tool.

Bluetooth Protocols

In memory 105 various Bluetooth protocols 124 and/or other short range RF protocols are stored. The Bluetooth protocol stack 124 may include a link management protocol (LMP) 174, a logical link control and application protocol (L2CAP) 175, a service discovery protocol (SDP) 176, RFCOMM 177 (i.e., a serial line emulation protocol), linked manager (LM) 178, and/or the like. The LM 178 runs on the CPU in the client to manage communications between itself and other Bluetooth devices via LMP 174, and/or the like. After the connection of a Bluetooth client with another device, SDP enables the querying and identification of the abilities of other Bluetooth devices. L2CAP provides multiplexing, packet segmentation and reassembly of data as it is communicated between the client and other Bluetooth enabled devices. Another protocol held in memory 105 is the RFCOMM, which is a serial line emulation protocol that enables Bluetooth devices to intercommunicate by emulating a serial line. These various protocols interact to encode and decode data as given by the CPU through a base band 107. LMP and L2CAP run directly on top of base band 107. RFCOMM and SDP run on top of L2CAP. It should be understood that the above is only one example and Bluetooth device configuration. Optionally, the Bluetooth protocol stack may be enhanced to incorporate the functionality the RP tool 117 allowing for remote-page communications. Configurations will vary in detail and implementation, however, as long as any given configuration employs a Bluetooth protocol, its performance may be enhanced with a Bluetooth remote-page tool.

Cellular Protocols

In memory 105 various optional cellular protocols 116 protocols may be stored. A single or multiple known protocols may be included and enabled with the appropriate cellular transceiver(s) 112 such as, but not limited to: base station controller to base transceiver station (BTSM), code division multiple access (CDMA), general packet radio service (GPRS), global system for mobile telecommunications (GSM), and/or the like.

Cryptographic Server

A cryptographic module 118 is stored instruction signals that is executed by the CPU 103, a cryptographic processor, and/or the like. Preferably, cryptographic processor interfaces will allow for expedition of encryption and/or decryption requests by the cryptographic module; however, the cryptographic module, alternatively, may run on a conventional CPU. Preferably, the cryptographic module allows for the encryption and/or decryption of provided data. Preferably, the cryptographic module allows for both symmetric and asymmetric (e.g., Pretty Good Protection (PGP)) encryption and/or decryption. Preferably, the cryptographic module allows conventional cryptographic techniques such as, but not limited to: digital certificates (e.g., X.509 authentication framework), digital signatures, dual signatures, enveloping, password access protection, public key management, and/or the like. Preferably, the cryptographic module will facilitate numerous (encryption and/or decryption) security protocols such as, but not limited to: checksum, Data Encryption Standard (DES), Elliptical Curve Encryption (ECC), International Data Encryption Algorithm (DEA), Message Digest 5 (MD5, which is a one way has function), passwords, RC5 (Rivest Cipher), Rijndael, RSA (which is an Internet encryption and authentication system that uses an algorithm developed in 1977 by Ron Rivest, Adi Shamir, and Leonard Adleman), Secure Has Algorithm (SHA), Secure Socket Layer (SSL), Secure Hypertest Transfer Protocol (HTTPS), and/or the like. The cryptographic module facilitates the process of "security authorization" whereby access to a resource is inhibited by a security protocol wherein the cryptographic module effects authorized access to the secured resource. A cryptographic module may communicate to and/or with other modules in a module collection, including itself, and/or facilities of the like. Preferably, the cryptographic module supports encryption schemes allowing for the secure transmission of information across a communications network to enable a client 101 to engage in secure transactions if so desired by users. The cryptographic module facilitates the secure accessing of resources on a client and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses. In one non-limiting example embodiment, such a cryptographic tool may be provided as a library within the operating system accessible to all other modules in a module collection through an application program interface (API). The cryptographic tool enables local processing of authentication information 119*d*.

User Interface

A user interface module 121 is comprised of stored instruction signals that may be executed by the CPU. The user interface may be a conventional graphic user interface as provided by, with, and/or atop operating systems and/or operating environments such as Apple Macintosh OS, e.g., Aqua, Microsoft Windows (CE), Palm OS, proprietary cellular telephone interfaces, textual (e.g., command line) interfaces, Unix X Windows (KDE, Gnome, and/or the like), and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Bluetooth Connectivity Tool

Furthermore, within the memory 105 is a Bluetooth connectivity tool (connectivity tool) 122. The connectivity tool is responsible for storing information obtained from other Bluetooth enabled devices encountered by the client 101. In one non-limiting example embodiment, the connectivity tool comprises and/or employs a device adding facility (which will be described in greater detail in FIG. 6) and a device selection facility (which will be described in greater detail in FIGS. 7 and 8). The connectivity tool interacts with the Bluetooth directory database 119 by saving information received from Bluetooth devices responding to an inquiry and/or page message from the client 101. The type of information extracted and/or saved from such responses is described in greater detail below 119*a-d*. Upon having stored information about a device, the connectivity tool allows a user to create a communication connection with a specific device while ignoring other Bluetooth devices within its coverage area and/or without requiring an inquiry/response negotiation. The connectivity tool may communicate to and/or with other modules in a module collection, including itself, and/or facilities of the like. The connectivity tool communicates with other program modules, user interfaces, and/or the like. For example, the connectivity tool may contain, communicate, generate, obtain, and/or provide program module, system, user, and/or data communications, requests, and/or responses. The connectivity tool, once executed by the CPU, may enable the interaction with communications networks, data, I/O, peripheral devices, program modules, memory, user input devices, and/or the like. The connectivity tool may employ the operating system or itself enable and/or provide protocols that allow the client to communicate with other entities through a communications network such as Bluetooth piconet.

Bluetooth Directory Database

A Bluetooth directory database (BTDDB) 119 may be embodied in a database and its stored data, wherein the database comprises stored instruction signals, which may be executed by the CPU to store and retrieve data; the stored instruction signal portion configuring the CPU to process the stored data. Ideally the database is a conventional, fault tolerant, relational, scalable, secure database such as HanD-Base, Oracle (e.g., 8iLite Optimized Object-Relational database), thinkDB, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively and/or in environments where processing power and memory are limited, the Bluetooth directory database may be implemented using various standard data-structures, such as an array, hash, (linked) list, struct, table, and/or the like. Such datastructures may be stored in memory and/or in (structured) files. If the Bluetooth directory database is implemented as a data-structure, the use of the Bluetooth directory database database may be integrated into another module such as the Bluetooth RP tool 117. Databases may be consolidated and/or distributed in countless variations through standard data processing techniques. Portions of databases, e.g., tables, may be exported and/or imported and thus decentralized and/or integrated. In one non-limiting example embodiment, the database module 119 includes tables such as but not limited to a Bluetooth: identifier (e.g., a Bluetooth address) table 119a, name (e.g., a cleartext name to represent a Bluetooth enabled device) table 119b, profile(s) (e.g., generic object exchange profile (GOEP), service discovery application profile (SDAP) compliant profiles, etc.) table 119c, authentication (e.g., personal identification number (PIN), password, digital certificate, encryption key, etc.) table 119d, and/or the like. All the tables may be related by the Bluetooth identifier 119a key field entries as they are unique. In an alternative embodiment, these tables may be decentralized into their own databases and their respective database controllers (i.e., individual database for each of the above tables may exist). By employing standard data processing techniques, one may further distribute the databases over several Bluetooth enabled device systemizations and/or storage devices. Similarly, configurations of the decentralized database controllers may be varied by consolidating and/or distributing the various database modules 119a-d. The Bluetooth directory database may be configured to keep track of other Bluetooth enabled devices that have passed within the range of the client 101 as well as user requests, and/or other various transactions.

A Bluetooth directory database may communicate to and/or with other modules in a module collection, including itself, and/or facilities of the like. Most frequently, the Bluetooth directory database communicates with a Bluetooth RP tool 117, other program modules, and/or the like. The database may contain, retain, and provide information regarding other Bluetooth devices and data.

In an alternative embodiment, a Bluetooth identifier field 119a is added to a normal contact database (e.g., such as those found in cellular telephones, PDAs, and/or the like) and linked to a Bluetooth directory database. Such an embodiment is discussed further in FIG. 6.

Bluetooth Remote-Page Tool

Furthermore, within the memory 105 is a Bluetooth remote-page tool (RP tool) 117. The RP tool is responsible for parsing and issuing remote-page commands/messages to and from other Bluetooth enabled devices encountered by the client 101. The RP tool's functionality is described in greater detail below (FIGS. 7-14). In one alternative embodiment, the RP tool is provided as part of the Bluetooth protocol stack 124. The RP tool enables a client 101 to both send and receive messages beyond its own coverage area and that of nearby Bluetooth access points (described in greater detail in FIG. 5). The RP tool may communicate to and/or with other modules in a module collection, including itself, a connectivity tool 122, and/or facilities of the like. The RP tool communicates with other program modules, user interfaces, and/or the like. For example, the RP tool may contain, communicate, generate, obtain, and/or provide program module, system, user, and/or data communications, requests, and/or responses. The RP tool, once executed by the CPU, may enable the interaction with communications networks, data, I/O, peripheral devices, program modules, memory, user input devices, and/or the like. The RP tool may employ the operating system, Bluetooth protocol stack or itself enable and/or provide operation codes that allow the client to communicate with other entities through a communications network such as the Internet.

Module Collection Configuration

The functionality of any of the client components and/or functionalities may be combined, consolidated, and/or distributed in any number of ways to facilitate development and/or deployment. Similarly, the module collection may be combined in any number of ways to facilitate deployment and/or development. To accomplish this, one must simply integrate the components into a common component base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single client, and/or across numerous clients to improve performance through load balancing data processing techniques. Furthermore, single instances may also be distributed across multiple controllers and/or storage devices; e.g., databases.

All program module instances and clients working in concert may do so through standard data processing communication techniques.

The preferred client configuration will depend on the context of system deployment. Factors such as, but not limited to, the capacity, cost, location, and/or purpose of the underlying hardware resources may affect deployment requirements and configuration. For example, a printer enabled with the Bluetooth connectivity tool will have a different set of requirements than a laptop enabled with the Bluetooth connectivity tool. Regardless of if the configuration results in more consolidated and/or integrated modules, results in a more distributed series of modules, and/or results in some combination between a consolidated and/or distributed configuration, communication of data may be communicated, obtained, and/or provided. Instances of modules (from the module collection) consolidated into a common component base from the program module collection may communicate, obtain, and/or provide data. This may be accomplished through standard data processing techniques such as, but not limited to: data referencing (e.g., pointers), internal messaging, object instance variable communication, shared memory space, variable passing, and/or the like (intra-application communication).

If module collection components are discrete, separate, and/or external to one another, then communicating, obtaining, and/or providing data with and/or to other module components may be accomplished through standard data processing techniques such as, but not limited to: API information passage; (distributed) component object model ((D)COM), (distributed) object linking and embedding ((D)OLE), and/or the like), common object request broker architecture (CORBA), process pipes, shared files, and/or the like (inter-application communication). Messages sent between discrete module components for inter-application communication or within memory spaces of a singular module for intra-application application communication may be facilitated through the creation and parsing of a grammar. A grammar may be developed by using standard development tools such as lex, yacc, and/or the like, which allow for grammar generation and parsing functionality, which in turn may form the basis of communication messages within and between modules. Again, the preferable embodiment will depend upon the context of system deployment.

Also, it is to be understood that the logical and/or topological structure of any combination of the module collection and/or the present invention as described in the figures and throughout are not limited to a fixed execution order and/or arrangement, but rather, any disclosed order is exemplary and all functional equivalents, regardless of order, are contemplated by the disclosure. Furthermore, it is to be understood that such structures are not limited to serial execution, but rather, any number of threads, processes, services, servers, and/or the like that may execute asynchronously, simultaneously, synchronously, and/or the like are contemplated by the disclosure.

In one non-limiting example embodiment, the cryptographic module 118 and Bluetooth protocol stack 124 are integrated into the operating system 115.

Bluetooth Device Communication

FIG. 1 further illustrates that the client 101 may communicate wirelessly 133 via Bluetooth protocol with another client 192b.

Bluetooth Device Range

Bluetooth Device Out of Range

FIG. 2 is a block diagram of two Bluetooth transceiver enabled devices 192 D1 and D2. The effective coverage area 201, 202 offered by a given Bluetooth enabled device (e.g., D1 or D2) will vary based on the signal strength of the Bluetooth transceiver of in a given device. For example, a typical Bluetooth device has a radial range of approximately 10 meters, however, with a 100 milliwatt transceiver the effective radial coverage area may be extended to approximately 100 meters. In other embodiments, various antenna constructs may focus and/or reshape the coverage area into a non-radial geometry.

Thus, FIG. 2 illustrates a scenario when D1 and D2 are outside each other's coverage areas. In such a scenario, no communications may take place between D1 and D2.

For communications to take place between D1 and D2, the coverage area 201 of D1 (originating device) must reach and/or overlap the transceiver and/or its antenna within D2 (recipient device) for sending communications from D1 to D2, and in turn, the coverage area 202 of D2 must reach and/or overlap the transceiver within D1 to receive communications at D1 from D2.

Bluetooth Devices In and Out of Range

Figure 3:
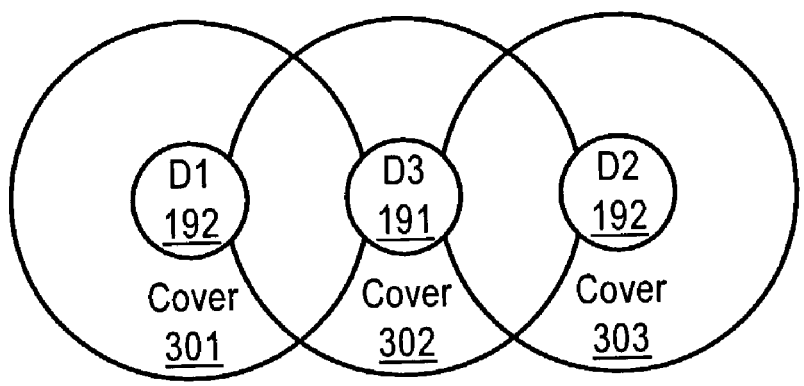
FIG. 3 is a block diagram of three Bluetooth transceiver enabled devices that are both inside and outside each other's coverage areas.

FIG. 3 is a block diagram of three Bluetooth transceiver enabled devices, D1 and D2 that are outside each other's coverage areas 301, 303, and device D3 191 that is in range of both D1 and D2 through D3's coverage area 302. Thus, in such a scenario devices D1 and D2 could not directly communicate with one another, while device D3 could communicate with each of the other devices.

Bluetooth Devices In Range

Figure 4:
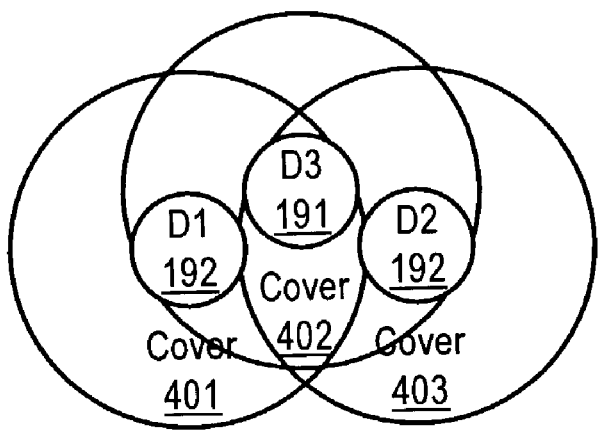
FIG. 4 is a block diagram of three Bluetooth transceiver enabled devices that are inside each other's coverage areas.

FIG. 4 is a block diagram of three of three Bluetooth transceiver enabled devices D1, D2, and D3 that are all within each other's coverage areas 401, 403, 402. Thus, in such a scenario each of the devices D1, D2, and D3 could directly communicate with one another.

As clients 101 come in and out of range of one another, the Bluetooth connectivity tool on each of the devices stores information obtained through the standard Bluetooth protocol negotiations, i.e., information obtained through inquiry and inquiry responses as well as subsequent page and page-responses. Information obtained through Bluetooth negotiation responses may be stored in the Bluetooth directory database including the Bluetooth address, name, profile, authentication, and/or the like information received from responding Bluetooth devices.

Bluetooth Enabled Remote-page Device

Figure 5:
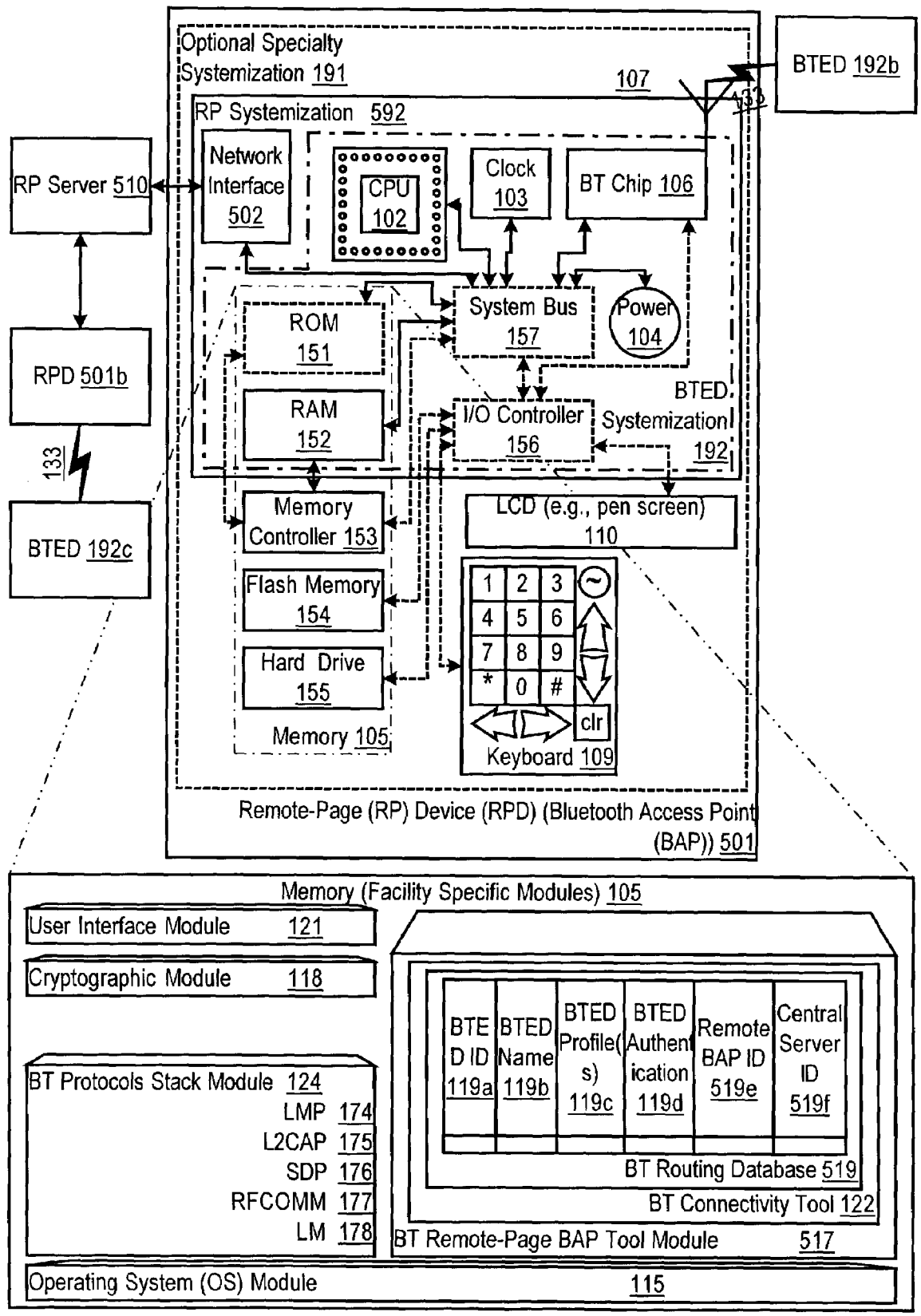
FIG. 5 illustrates a schematic overview of one non-limiting example embodiment of a remote-page enabled a remote-page device.

FIG. 5 illustrates a schematic overview of one non-limiting example embodiment of a remote-page enabled Bluetooth access point (remote-page device) 501. A remote-page device 501 may be configured similarly to the Bluetooth enabled device 101 of FIG. 1 with the following variations. The remote-page device 501 is comprised of a Bluetooth enabled systemization 192 (dash-dot line) of FIG. 1, a communications network interface 502 (the Bluetooth enabled systemization 192 and the communications network interface collectively being a remote-page device systemization 592), a routing database 519 instead of and/or in addition to the Bluetooth directory database 119, and an optional specialty systemization 191. In one non-limiting example embodiment, the specialty systemization 191 may provide the communications network interface 502, e.g., a cellular link carrier for TCP/IP protocol communications. Optional items are marked by dotted lines, while dash-dot lines show greater detail within the item.

The communications network interface 502 may employ any number of physical connections and employ appropriate carrier protocols. Network interfaces 502 may accept, communicate, and/or connect to a communications network 513. Network interfaces may employ connection protocols such as, but not limited to: direct connect, Ethernet (e.g., thick, thin, twisted pair 10/100/1000 Base T, and/or the like), Token Ring, wireless connection (e.g., Bluetooth, IEEE 802.11b, and/or the like), and/or the like. A communications network may be any one and/or the combination of the following: a direct interconnection; the Internet; an intranet, a local area network (LAN); metropolitan area network (MAN); an operating missions as nodes on the internet (OMNI); a pico network; a secured custom connection; a wide area network (WAN); a wireless network (e.g., Bluetooth, wireless application protocol (WAP), I-mode, and/or the like); and/or the like. A network interface may be regarded as a specialized form of an input output interface. In one-nonlimiting example embodiment, user input may be provided remotely through a the remote-page device's network interface. For example, it is possible to provide an HTML based user interface to access and/or change the features and/or settings of the remote-page device 501, which may be accessed through its network interface 502 allowing the user to specify values in memory 105.

The optional specialty systemization 191 may be comprised similarly to the Bluetooth enabled device 101 of Figure. In an alternative embodiment, the optional specialty systemization 191 may employ the I/O controller 156 to provide Input Output interfaces, user input devices, peripheral device and/or the like connectivity.

Input Output interfaces (I/O) (not pictured, but connecting to the I/O controller) may accept, communicate, and/or connect to user input devices, peripheral devices, cryptographic, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394; infrared; joystick; keyboard; midi; optical; PC AT; PS/2; parallel; radio; serial; USB; video interface: BNC, composite, digital, RCA, S-Video, VGA, and/or the like; wireless; and/or the like. A common output device is a video display, which typically comprises a CRT or LCD based monitor with an interface (e.g., VGA circuitry and cable) that accepts signals from a video interface. The video interface composites information generated by a computer systemization and generates video signals based on the composited information. Typically, the video interface provides the composited video information through a video connection interface that accepts a video display interface (e.g., a standard 15 pin VGA connector accepting a VGA display cable).

User input devices may be card readers, dongles, finger print readers, gloves, graphics pads, joysticks, keyboards, mouse (mice), trackballs, trackpads, retina readers, and/or the like.

Peripheral devices may be connected and/or communicate with or to I/O and/or with or to other facilities of the like such as network interfaces, storage interfaces, and/or the like). Peripheral devices may be cameras, dongles (for copy protection, ensuring secure transactions as a digital signature, and/or the like), external processors (for added functionality), goggles, microphones, monitors, network interfaces, printers, scanners, storage devices, visors, and/or the like.

Module Collection

Similar to the module collection of FIG. 1, the memory 105 may contain a collection of program modules and/or data such as, but not limited to: an operating system 115; Bluetooth communication protocol including a Bluetooth protocol stack 124; cellular communication protocols (if any) 116; cryptographic module 118, user interface 121; Remote-page BAP tool 117; Bluetooth connectivity tool 122; Bluetooth routing database 519; and other short range radio frequency protocols (if any); and/or the like.

Bluetooth Remote-Page BAP Tool

Furthermore, within the memory 105 is a Bluetooth remote-page BAP tool (BAP tool) 117. The BAP tool is responsible for parsing and issuing BAP notifications remote-page commands/messages to and from other Bluetooth enabled devices, other BAPs, and or centralized remote-page servers (discussed in greater detail below in FIG. 6) encountered by the BAP 501. The BAP tool's functionality is described in greater detail below (FIGS. 7-14). The BAP tool enables clients 101 of FIG. 1 to both send and receive messages beyond their own coverage area and that of itself. The BAP tool may communicate to and/or with other modules in a module collection, including itself, a connectivity tool 122, a routing database 519, and/or facilities of the like. The BAP tool communicates with other program modules, user interfaces, and/or the like. For example, the BAP tool may contain, communicate, generate, obtain, and/or provide program module, system, user, and/or data communications, requests, and/or responses. The BAP tool, once executed by the CPU, may enable the interaction with communications networks, data, I/O, peripheral devices, program modules, memory, user input devices, and/or the like. The BAP tool may employ the operating system, Bluetooth protocol stack or itself enable and/or provide operation codes that allow the client to communicate with other entities through a communications network such as the Internet, a Bluetooth piconet, and/or the like.

Bluetooth Routing Database

A Bluetooth routing database (routing DB) 519 may be embodied in a database and its stored data, wherein the database comprises stored instruction signals, which may be executed by the CPU to store and retrieve data; the stored instruction signal portion configuring the CPU to process the stored data. Ideally the database is a conventional, fault tolerant, relational, scalable, secure database such as HanDBase, Oracle, Sybase, thinkDB, and/or the like. Relational databases are an extension of a flat file. Relational databases consist of a series of related tables as has already been discussed above in FIG. 1.

In one non-limiting example embodiment, the database module 119 includes tables such as but not limited to tables 119a-119d as discussed above in Figure and: remote BAP identifiers (e.g., a BAP Bluetooth address, a BAP Internet address, and/or the like) table 119e, and central remote-page server (e.g., the address of all known central remote-page servers) table 119e.

A Bluetooth routing database may communicate to and/or with other modules in a module collection, including itself, and/or facilities of the like. Most frequently, the Bluetooth directory database communicates with a Bluetooth BAP tool 117, other program modules, and/or the like. Configuration various to the routing database are similar to those discussed regarding the BTDDB 119 above in FIG. 1.

Bluetooth Device Communication

FIG. 5 further illustrates that the RPD 501 may communicate wirelessly 133 via Bluetooth protocol with a client 192b and with a central remote-page server 510 and/or another BAP 501b (via a communications network such as the Internet). In turn, the other RPD 501b may itself communicate with an other client 192c.

Remote-Page Server

Figure 6:
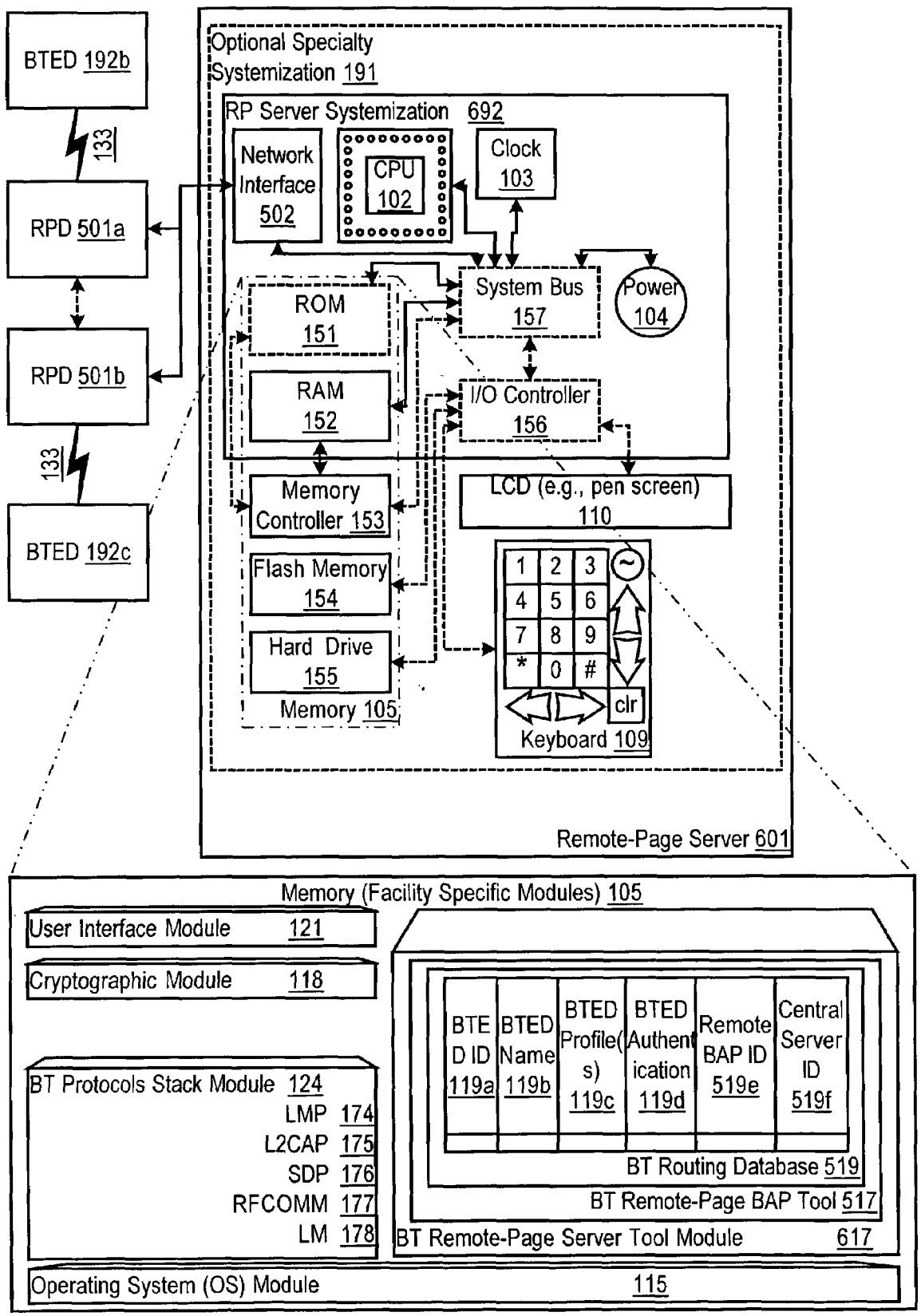
FIG. 6 illustrates a schematic overview of one non-limiting example embodiment of a remote-page server.

FIG. 6 illustrates a schematic overview of one non-limiting example embodiment of a remote-page server (central server or remote-page server) 601. A remote-page server 601 may be configured similarly to the remote-page device 501 of FIG. 5 with the following variations. The remote-page server 601 is comprised of a remote-page server systemization 692 (which is similar to the remote-page systemization 592 of FIG. 5 except no Bluetooth chip 106 is require, although it may optionally be included), and an optional specialty systemization 191. In one non-limiting example embodiment, the specialty systemization 191 may provide the communications network interface 502, e.g., an IEEE 802.11a carrier for TCP/IP protocol communications. Optional items are marked by dotted lines, while dash-dot lines show greater detail within the item.

The communications network interface 502 may employ any number of physical connections and employ appropriate carrier protocols as has already been discussed above in FIG. 5.

The optional specialty systemization 191 may be comprised similarly to the remote-page device 501 as discussed above in FIG. 5.

Module Collection

Similar to the module collection of FIG. 5, the memory 105 may contain a collection of program modules and/or data such as, but not limited to: an operating system 115; Bluetooth communication protocol including a Bluetooth protocol stack 124; cellular communication protocols (if any) 116; cryptographic module 118, user interface 121; Remote-page server tool 617; Bluetooth remote-page BAP tool 517 (as discussed above in FIG. 5); Bluetooth routing database 519; and other short range radio frequency protocols (if any); and/or the like.

Bluetooth Remote-Page Server Tool

Furthermore, within the memory 105 is a Bluetooth remote-page Server tool (server tool) 117. The server tool is responsible for passing and issuing BAP notifications and/or remote-page commands/messages to and from other remote-page servers, other BAPs, encountered by the remote-page server 601. The server tool's functionality is described in greater detail below (FIGS. 7-14). The server tool enables BAPs 501 of FIG. 5 (and subsequently clients 101 of FIG. 1) to both send and receive messages beyond their own coverage area. The server tool may communicate to and/or with other modules in a module collection, including itself, a BAP tool 517, a routing database 519, and/or facilities of the like. The server tool communicates with other program modules, user interfaces, and/or the like. For example, the server tool may contain, communicate, generate, requests, and/or responses. The server tool, once executed by the CPU, may enable the interaction with communications networks, data, I/O, peripheral devices, program modules, memory, user input devices, and/or the like. The server tool may employ the operating system, Bluetooth protocol stack or itself enable BAPs to communicate with other entities through a communications network such as the Internet, and/or the like.

In an alternative embodiment, the functionality of the server tool 617 and remote-page server 601 may be combined with that of a BAP tool 517 and a BAP 501.

Bluetooth Device Communication

FIG. 6 further illustrates that the remote-page server 601 may communicate over a communications network with remote-age devices 501a and 501b. The remote-page server may provide the RPDs 501a and 501b with information allowing them to communicate over the communications network without its further interaction. In turn, the other RPDs 501a and 501b may communicate with an clients 192b and 192c, respectively, in their coverage areas.

Remote-page Device Registration Tool

Figure 7:
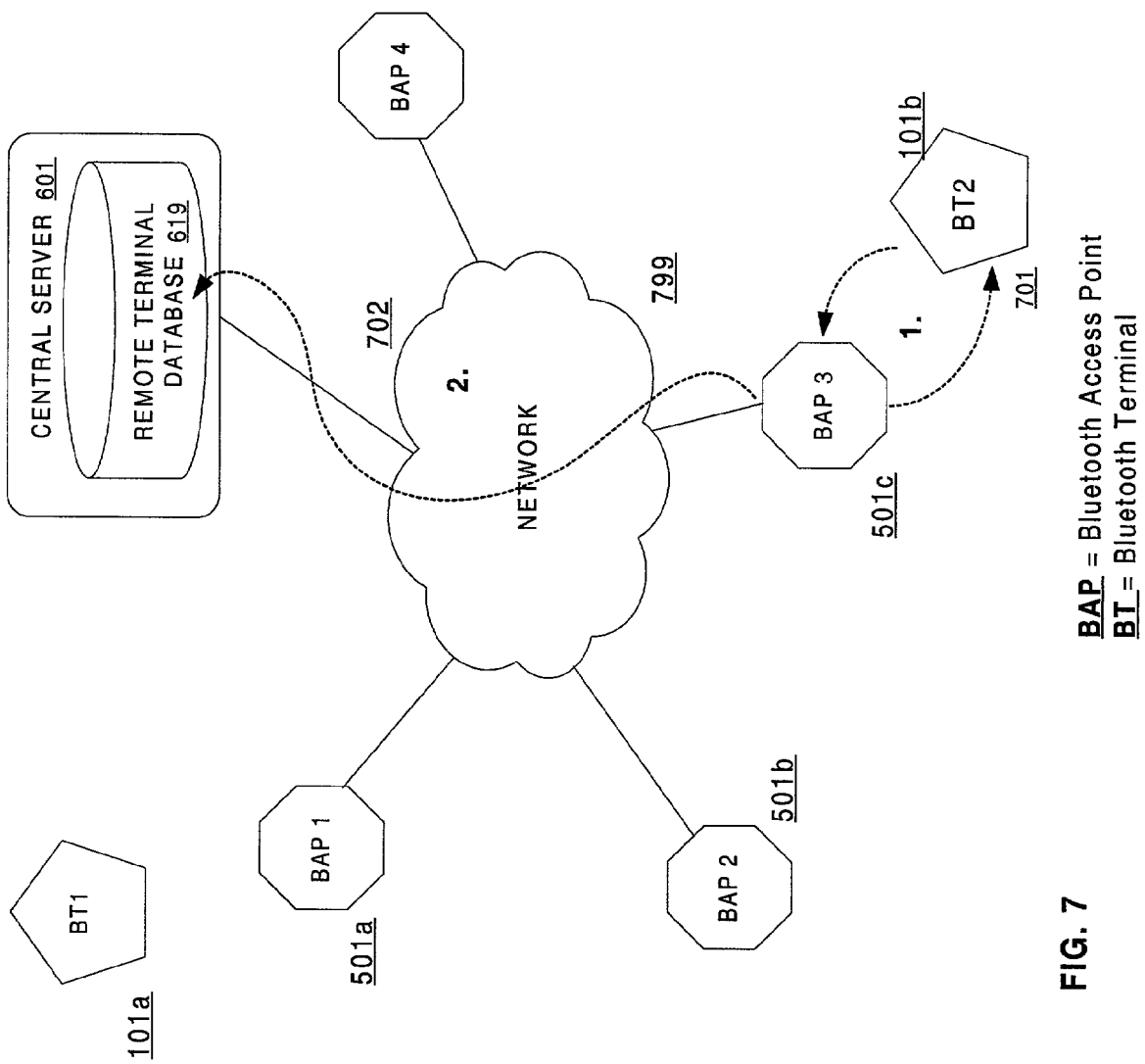
FIG. 7 illustrates a schematic overview of one non-limiting example embodiment of a remote-page device registration tool.

FIG. 7 illustrates a schematic overview of one non-limiting example embodiment of a remote-page device registration tool (registration tool). The registration tool enables a centralized remote-page server (central server) 601 to track any terminal devices 101 communicating with Bluetooth access points (BAPs) 501 that are known to the central server 601. The figure described an example network typology and communication between two Bluetooth clients 110a and 101b. The clients are outside of each other's coverage area. The central server 601 knows of the existence of several BLuetooth access points 501a, 501b 501c, 501d. That addresses of the BAPs are stored in a remote-page client database (remote-page database) 619, which is accessible by the central remote-page server 601. The central server and Bluetooth access points are interconnected through a network 799. The network 799 may be any type of communications network, such as but not limited to the Internet.

Bluetooth access point 3 (BAP3) 501c sends inquiry messages periodically to determine what Bluetooth enabled devices enter its coverage area. Bluetooth client 2 (BT2) 101b enters the coverage area of BAP3. In this example, BAP3 receives an inquiry response from BT2 701. Upon receiving the inquiry response from BT2, BAP3 sends a notification message to the central server 601 across the network 799. The central server stores 702 the received information in the remote-page client database 619. The communication of notification messages was discussed and co-pending application Ser. No. XXXNC28529_NotificationApplication entitled "XXXX," and has been incorporated by reference above. Thereby, the central remote-page server 601 obtains the Bluetooth address of BT2 and BAP3 as well as the network (i.e., Internet protocol) address of BAP3 and is able to store the received information and associations therebetween 702. Similarly, when a client is no longer within range of its BAP, the remote-page database 619 is updated.

Figure 8:
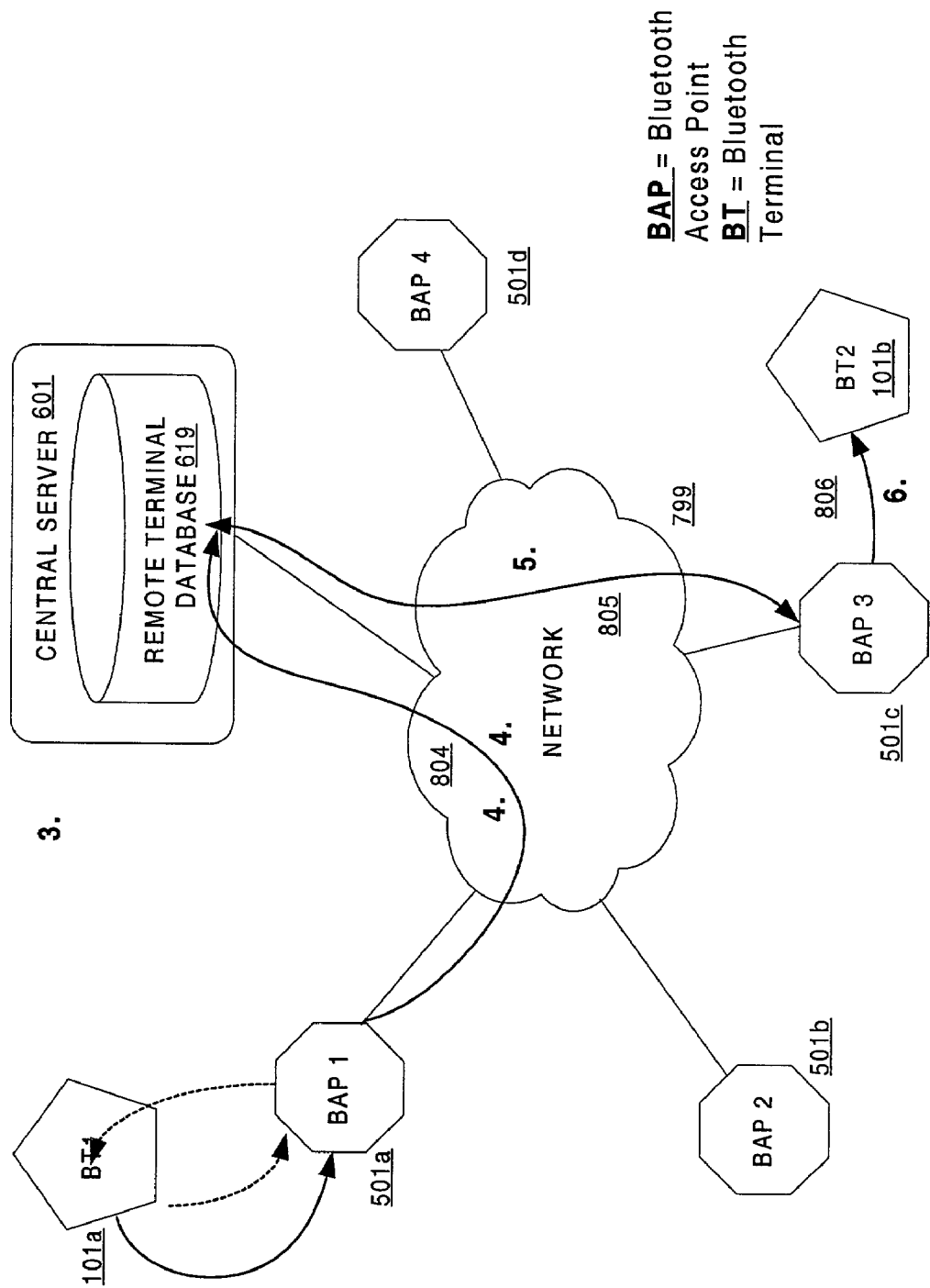
FIG. 8 illustrates a schematic overview that continues to show remote-page registration tool interactivity of FIG. 7.

FIG. 8 illustrates a schematic overview that continues to show remote-page registration tool interactivity of FIG. 7. Bluetooth client 1 (BT1) 101a enters the coverage area of Bluetooth access point 1 (BAP1) 501a. Similar to FIG. 7, BT1 and BAP1 exchange inquiry messages and BT1's existence is made known to the central server 601. The user of BT1 wishes to communicate with BT2. In one non-limiting example embodiment, the user of BT1 knows of BT2's address and enters it into BT1. In another example, the address of BT2 is stored in an address book in BT1. In another alternative example, BT1 has a connectivity tool that allows the user of BT1 to specify a desired target device, e.g., BT2. The connectivity tool is described in co-pending application titled "Apparatus, Method and System of a Connectivity Tool in Bluetooth Devices," which was filed on May XXX, 2002, and has been incorporated by reference above.

Upon instruction to communicate with BT2, BT1 sends a remote-page message to BAP1 803, which includes the address of BT2, e.g., as provided by BT1's connectivity tool. BAP1 sends a modified remote-page message to the central server 601, which then searches the remote-page database 619 to determine if BT2 is communicating with any known BAPs on the network 804. The central server 601 may send the modified remote-page message to BAP3 805, which is identified as being disposed in communication with BT2. The central server 601 may identify client devices that are actively communicating by issuing a query on the remote-page database 619 based on the desired target's, i.e., BT2's address. In this example, the query will identify an entry in the remote-page database 619 that was previously made upon the registration of BT2's address 702 of FIG. 7, BAP3 may then send a page message to BT2 806.

Figure 9:
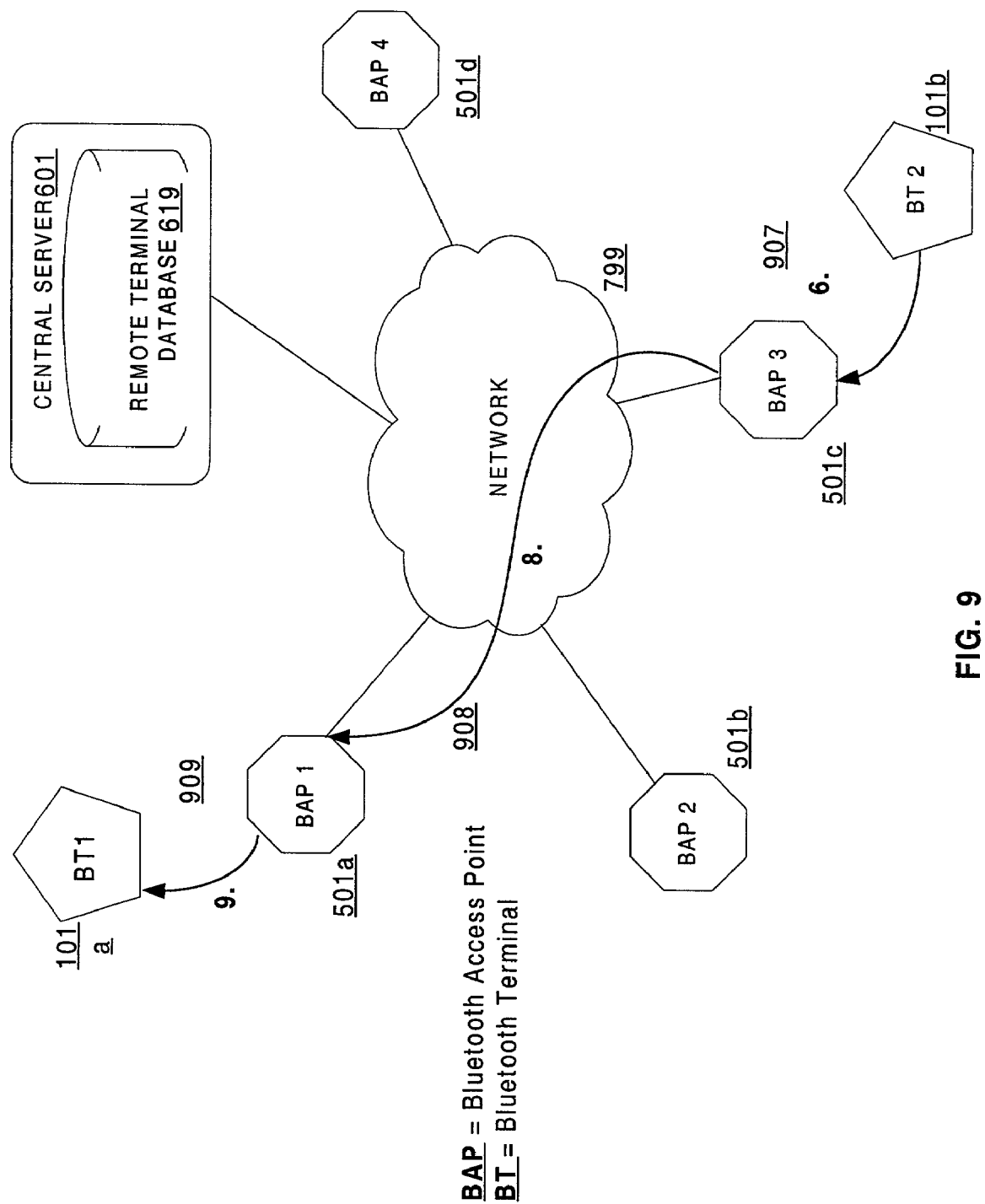
FIG. 9 illustrates a schematic overview that continues to show remote-page registration tool interactivity of FIG. 8.

FIG. 9 illustrates a schematic overview that continues to shoe remote-page registration tool interactivity of FIG. 8. In response to BAP's page message, BT2 101b sends a page-response message back to BAP3 907. BAP3 is now aware of BAP1's address (i.e., which was obtained from the modified remote-page messsage 804, 805 of FIG. 8) and BAP3 may send a modified remote-page response message to BAP1 908. Upon receiving the modified remote-page-response 908, BAP1 may send the modified remote-page-response message to BT1 101a, 909. Thus, a communication link is established between BT1 101a and BT2 101b.

Remote-page Device Registration Tool

Figure 10:
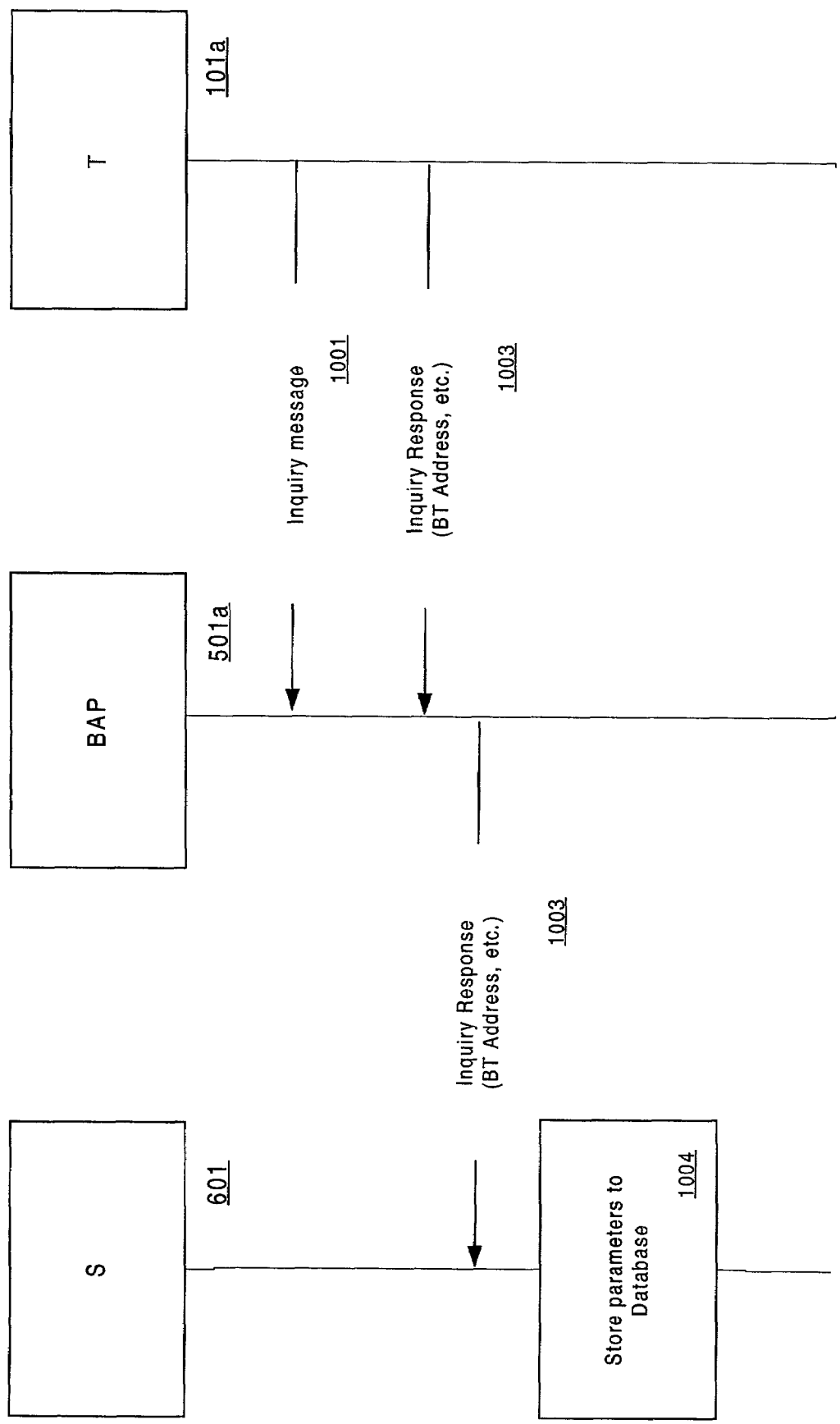
FIG. 10 illustrates a block data and logic flow diagram of one non-limiting example embodiment of a remote-page device registration tool.

FIG. 10 illustrates a block data and logic flow diagram of one non-limiting example embodiment of a remote-page device registration tool as engaged by a connectivity tool by a client (BT1) 101a. A BAP (BAP1) 501a issues inquiry messages 1001 periodically within its cover area. A client 101a that enters the cover range of the BAP1 501a may send an inquiry response 1002 back to BAP1 501a. The BAP 501a forwards the client's inquiry response 1002 on to a central remote-page server 601. The Bluetooth address of the client 101a (and if needed the Bluetooth and network address of the BAP 501a) are stored to a remote-page database 1004 along with other parameters as detailed in the XXXNC28529_NotificationApplication disclosure. The storage of parameters, i.e., information obtained from inquiry responses, at the remote-page database 1004, which is accessible by a centralized remote-page server 601, provides a data store that may be queried to identify remote BAPs and associated client's.

Remote-page Communications

Figure 11:
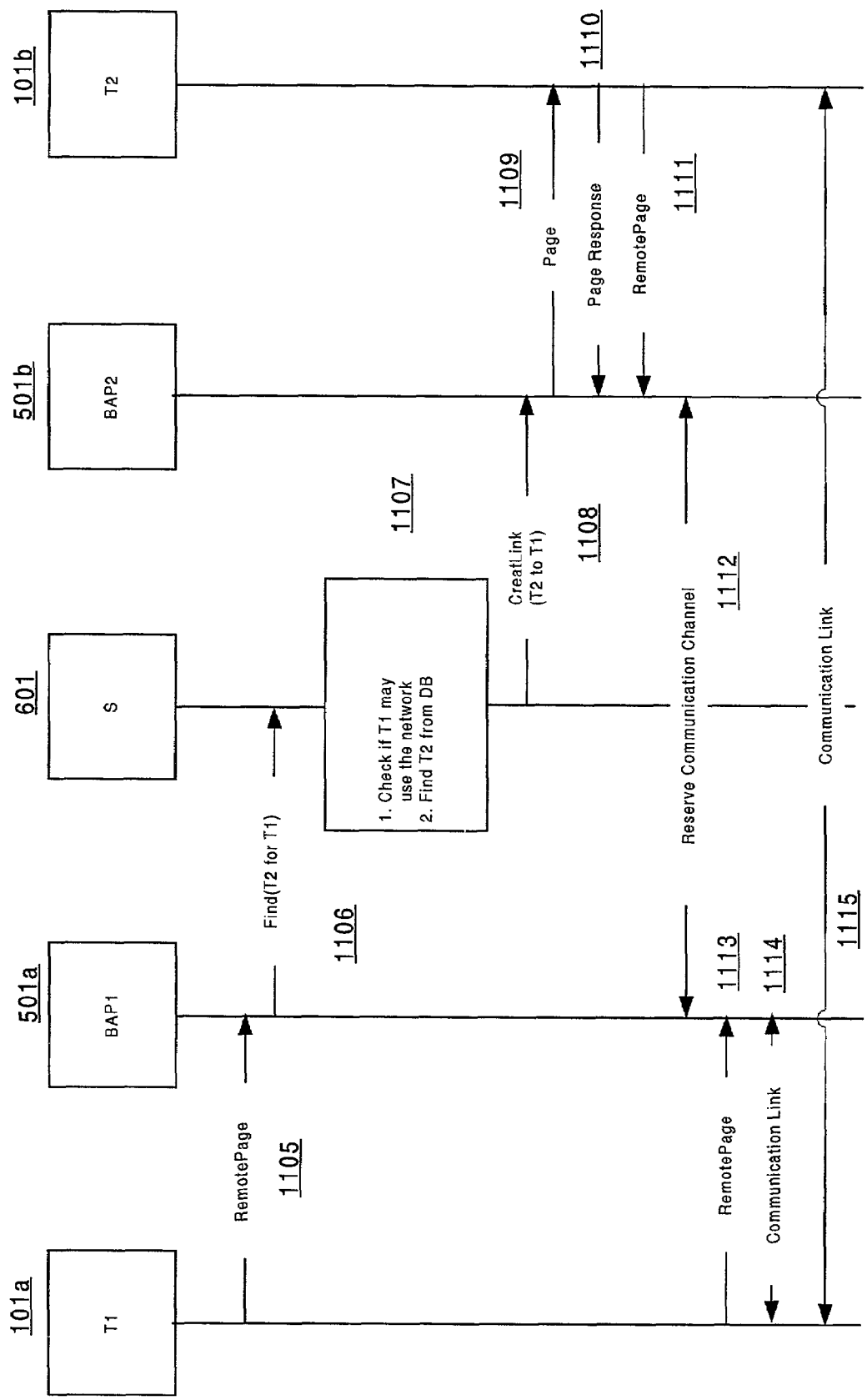
FIG. 11 illustrates a block data and logic flow diagram of one non-limiting example embodiment of a remote-page as issued from a connectivity tool.

FIG. 11 illustrates a block data and logic flow diagram of one non-limiting example embodiment of a remote-page as issued from a connectivity tool at a client 101*a*. In one example, a user at Bluetooth client 1 101*a* (BT1) wishes to communicate with Bluetooth client 2 101*b* (BT2). In one non-limiting example embodiment, BT1 101*a* may make use of a connectivity tool and retrieve BT2's Bluetooth address from its Bluetooth directory database 119 of FIG. 1. In such an instance, the connectivity tool of BT1 may not detect BT2 101*b* as BT2 is not within BT1's coverage area. However, a BAP 501*a* (BAP1) is identified through inquiry messages, and the connectivity tool may request that the user of BT1 confirm the issuance of a remote-page command to BAP1. In an alternative embodiment, BT1 issues a remote-page command automatically.

If the user does not desire to send a remote-page from the connectivity tool, then no remote-page message will be sent and BT1 and BT2 will fail to communicate as a consequence because they are outside one another's range. If a remote-page message is issued from BT1, then the remote-page will be sent from BT1 101*a* to BAP1 501*a* 1105. The remote-page message is similar to a Bluetooth page message; it addition to BAP1 specific parameters, the remote-page message also contains the Bluetooth address of BT2 as was provided by the connectivity tool. BAP1 communicates with the centralized remote-page server 601 to discern if the centralized remote-page server knows of any BAPs that are disposed in communication with BT2 1106.

Such BAP-to-central server communications are detailed in the XXXNC28529_NotificationApplication disclosure; in one example such communications may be achieved by BAP1 sending a query to the central server through its network interface over a communications network, e.g., the Internet. In one example embodiment, such queries of the remote-page database 619 are possible because the remote-page database 619 stores notifications from BAPs 702 of FIG. 7 resulting from client-to-BAP inquiry message communications 1107. Optionally, the centralized remote-page server 601 may verify that BT1 is authorized to use the network. Such verification may be achieved by querying database tables containing a field and entries of all authorized Bluetooth addresses 1107. A database table containing such Bluetooth addresses may be built by obtaining the Bluetooth addresses (e.g., by manually reading and entering the addresses, obtaining an address of the known device through it inquiry message, etc.) from authorized Bluetooth enabled devices. Such verification would limit abuse and unauthorized access of clients across a communications network.

Upon querying the remote-page database 619 for BT2's address 1107, if BT2 is not found, then no communication link will be formed between BT1 and BT2. If the central server and/or BAP1 fails to positively respond to BT1, such a negative response informs BT1 that BT2 is not available. If, however, BT2 is disposed in communication with one of the BAPs known to the centralized remote-page server 619, then a communications link between BT1 and BT2 may be established. If the centralized remote-page server 601 finds BT2's address, then the server may send a message to create a link. The create-link message identifies that a link should be established from BT2 to BT1. The create-link message is directed to the BAP (i.e., BAP2 501*b*) that is disposed in communication with the desired target client (i.e., BT2 101*b*) 1108. The proper BAP to which to send the create link message is identifiable by query from the remote-page database 619 because associations are maintained between database tables storing information regarding BAPs (e.g., BAP Bluetooth address, BAP Internet protocol address, etc.) and client addresses; such an association may be maintained by keying the tables to unique client addresses.

If BAP2 receives a message to create a link between BT2 and BT1 1108, then BAP2 issues a page command 1109 to BT2. Upon receiving a page-response message 1110 from BT2 101*b*, a communications link is established between BAP2 501*b* and BT2 101*b* 1111. Upon establishing a communications link between BAP2 501*b* and BT2 101*b*, BAP2 reserves a communications channel with BAP1 501*a* 1112. In one non-limiting example embodiment, such channel reservation 1112 is achieved through a BAP network interface 502 of FIG. 5 employing Internet protocol communications over a communications network. BAP1 501*a* may be reached by BAP2 501b by accessing BAP1 via its address, e.g. BAP1's Internet address. BAP2 may obtain BAP1's Internet protocol and/or other addresses from the centralized remote-page server's 601 remote-page database 619. Alternatively, BAP2 501*b* may obtain BAP1's address as part of the centralized remote-page server's 601 create-link message 1108 that was sent to BAP2. A BAPs Internet protocol address may be maintained in the remote-page database 619 in a table that is associated with other BAP information (e.g., the BAP Bluetooth address, etc.) as has already been discussed above. Upon reserving a communications channel 1112 between BAP1 and BAP2, BAP1 501*a* may send a page-response, which was initially obtained from BT2 1110 to BT1 1113 and sent to BAP1 across the reserved communication channel 1112. Upon obtaining a page-response 1113, BT1 101*a* establishes a communications link 1114 with BAP1 501*a*. Subsequent communications between BT1 and BAP1 1114 and BT2 and BAP2 1111, may flow through the reserved communication channel 1112 as if BT1 and BT2 were in each other's coverage area.

In an alternative embodiment, the communications connection between BAP2 and BT2 may be achieved by employing a remote-page instead of a page message. If the remote-page is used instead of the page message, then BAP2 will provide BT2 with a remote-page message that includes BT1's address 1109. Providing BT2 with a remote-page message including BT1's address is useful in that BT2 becomes aware of BT1's address and may store the address for future reference, e.g., with and for a connectivity tool. BAP-to-BAP messages may comprise a: sender Bluetooth address, target Bluetooth address, sender BAP identifier (e.g., Internet address), target BAP identifier, sender socket/port, target socket/port, and content. The content is it any data sent from BT1 that is to be received by BT2.

Figure 12:
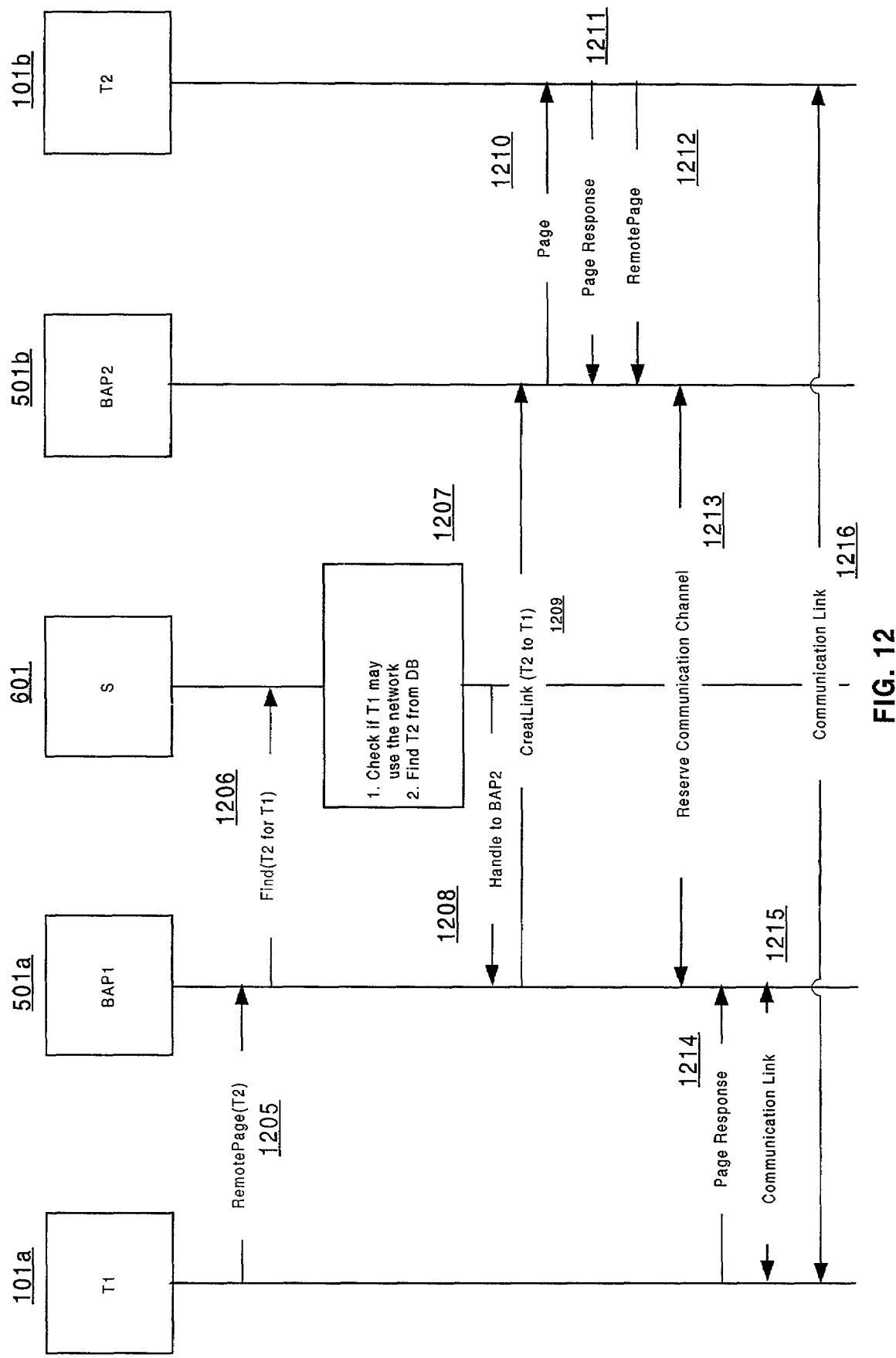
FIG. 12 illustrates a block data and logic flow diagram of an alternative example embodiment of a remote-page as issued from a connectivity tool.

FIG. 12 illustrates a block data and logic flow diagram of an alternative example embodiment of a remote-page as issued from a connectivity tool at a client 101*a*. Similarly to FIG. 11, BT1 101*a* issues a remote-page command for communicating with BT2 101*b* 1205 that is received by BAP1 501*a*. BAP1 sends a message to the centralized remote-page server 601 to find BT2 1206. If the centralized remote-page server 601 finds BT2's address, then the centralized remote-page server 601 will provide BAPs 501*a* with a identifier and/or address for BAP2 501*b* 1208. BAP1 501*a* will issue a command to BAP2 to create a link (from BT2 to BT1) 1209. Thereafter BAP2 501*b* issues a page 1210, obtains a page-response 1211, and establishes a communications link with BT2 1212. Then, BAP2 reserves a communications channel 1213 with BAP1 as has already been described above in FIG. 11. BT2's page-response to BAP2 is obtained at BAP1 501a through the reserved communications channel 1213 and sent to BT1 1214. BT1 and BAP1 then establish a communications link 1215, which thereby establishes a communications link between BT1 101a and BT2 101b, 1216. Communications then pass between BT1 and BT2 similarly as has already been discussed above. The central server's 601 ability to issue a create-link message to various BAPs (as illustrated by FIGS. 11 and 12) allows for performance management and load balancing as well as other advantages.

In an alternative embodiment, BAPs may be substituted with Bluetooth repeaters in the formation of a reserved communication channel 1213. Further, it should be noted that through the combination of a client 101 of FIG. 1, a remote-page enabled access point 501 of FIG. 5, and a remote-page server 601 of FIG. 6, a client may communicate across a communications network with devices other than another client, e.g., with a web page. Of further note, those other devices' addresses, e.g., Internet protocol devices, may be stored in a client's 101 of Figure connectivity tool 117 of FIG. 1 for eased and repeated access.

Remote-page Command Structure

FIG. 13 illustrates a structural diagram of one non-limiting example embodiment of a remote-page command. A command identifier (OCF) and command group identifier (OGF) is established for a remote-page command. The remote-page message may include the following data fields: a six byte field for maintaining the Bluetooth address of the originating BAP (BD_ADDR) 1301, a two byte field for maintaining the message's packet size (Packet_Type) 1302, a one byte field for maintaining the page-scan-repetition-mode (Page_Scan_Repetition_Mode) 1303, a one byte field maintaining the optional page-scan-mode (Page_Scan_Mode) 1304, a two byte field for maintaining the difference in time between master and slave clocks (Clock-Offset) 1305, a 1 byte field maintaining a setting to allow role switches (Allow_Role_Switches) 1306, and a six byte field for the Bluetooth address of the remote device (Remote_BD_ADDR) 1307.

Figure 14:
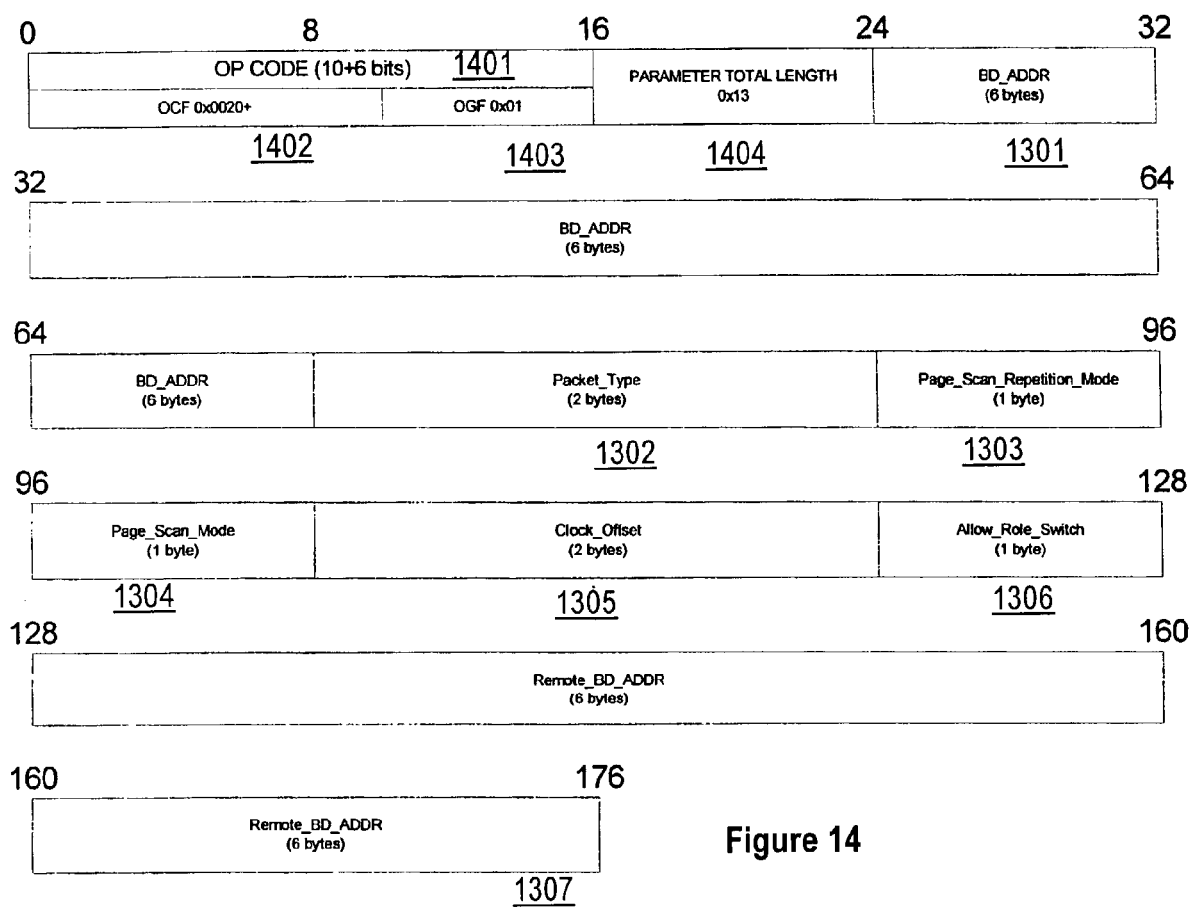
FIG. 14 illustrates a block diagram of one non-limiting example embodiment of remote-page command.

FIG. 14 illustrates a block diagram of one non-limiting example embodiment of remote-page command. Although FIG. 14 generally illustrates the remote-page fields already discussed in FIG. 13 1301-1307, more information is shown regarding the operation codes 1402, 1403 and parameter lengths for the remote-page 1404. FIG. 14 displays a remote-page message structure at the bit level. Thus, further to FIG. 13, the remote-page command provides a 10 bit field for the OCF 1402, a 6 bit field for the OGF 1403, and an 8 bit field to maintain parameter total lengths for the remote-page command 1404. Devices that are made aware of the remote-page OCF and/or OGF are able to parse the individual fields from the message structure to employ them for communications; e.g., by reading the remote-page operation code (i.e., OCF and OGF) and parameter total length a device may identify the remote-page as a discrete message and parse out its fields.

It should be understood that the above description is only representative of illustrative embodiments. For the convenience of the reader, the above descriptions have focused on a representative sample of all possible embodiments, a sample that teaches the principles of the invention. The description has not attempted to exhaustively enumerate all possible variations. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent, Thus, it is to be understood that the embodiments and variations shown and described herein are merely illustrative of the principles of this invention and that various modifications may be implemented without departing from the scope and spirit of the invention.

In addition, the disclosure herein includes other inventions not presently claimed. Applicant reserves all rights in those presently unclaimed inventions including the right to claim such inventions, file additional applications, continuations, continuations in part, divisions, and/or the like thereof.

What is claimed is:

1. A method, comprising:

sending a remote paging signal to an originating wireless access point from an originating device over a wireless short-range communication link, wherein the remote paging signal is destined to a remote target device located beyond a coverage area of the originating device for establishing a communications connection between the originating device and the remote target device, wherein the remote paging signal includes at least an address of the remote target device;

receiving a paging response signal from the originating wireless access point over the wireless short-range communication link, wherein the paging response signal is effected from the remote target device; and establishing, through the originating wireless access point and a remote wireless access point, the communications connection between the originating device and the remote target device, wherein the communications connection comprises a wireless short-range connection between the originating device and the originating wireless access point, a wireless short-range connection between the remote target device and the remote wireless access point, and a direct connection between the originating wireless access point and the remote wireless access point.

2. The method of claim 1, wherein the remote target device would otherwise be unable to respond to the originating device.

3. The method of claim 1, wherein the remote target device address is provided from a connectivity tool selection.

4. The method of claim 1, wherein the remote target device is outside a communication coverage area of the originating device.

5. The method of claim 1, wherein the remote target device is an Internet device.

6. The method of claim 1, wherein the establishment of a communications link with the remote target device includes establishing a communications link with the access point by employing the paging response signal.

7. The method of claim 1, wherein the address of the remote target device is a short-range communication address.

8. A method, comprising:

receiving a remote paging signal from an originating device over a wireless short-range communication link, wherein the remote paging signal is destined to a remote target device located beyond a coverage area of the originating device for establishing a communications connection between the originating device and the remote target device, wherein the remote paging signal includes at least an address of the remote target device;

querying a routing database to determine if the remote target device is present within a communication coverage area of an originating wireless access point;

receiving, from a central server distributing wireless access point-to-wireless access point link creation, identifying information of a remote wireless access point, and sending a link creation signal to the remote wireless access point;

receiving a communication channel reservation signal from the remote wireless access point, wherein the reservation signal includes remote wireless access point information, wherein the reservation signal includes a paging response signal from the remote wireless access point, wherein the paging response signal is effected from the remote target device;

reserving a communications channel for the remote wireless access point by employing the remote wireless access point information received with the reservation signal;

sending a paging response signal to the originating device over the wireless short-range communication link, wherein the paging response signal is effected from the remote target device, wherein the communications connection between the originating device and the remote target device is established, and wherein the communications connection comprises a wireless short-range connection between the originating device and the originating wireless access point, a wireless short-range connection between the remote target device and the remote wireless access point, and a direct connection between the originating wireless access point and the remote wireless access point.

9. The method of claim 8, wherein the remote target device would otherwise be unable to respond to the originating device.

10. The method of claim 8, wherein the remote target device is an Internet device.

11. The method of claim 8, wherein the remote target device is outside a communication coverage area of the originating device.

12. The method of claim 8, wherein the remote target device address is provided from a connectivity tool selection.

13. The method of claim 8, wherein the routing database is in an access point.

14. The method of claim 8, wherein the routing database is accessible by a central server.

15. The method of claim 8, wherein the originating device is a Bluetooth enabled device and the short-range radio-frequency communication is Bluetooth communication.

16. The method of claim 8, wherein the identifying information is a Bluetooth address.

17. The method of claim 8, wherein the identifying information is a network address.

18. The method of claim 17, the wherein the remote access point information further includes a communications port.

19. The method of claim 8, wherein the remote access point information includes a remote access point address, and content.

20. The method of claim 8, wherein the remote target device is outside a communication coverage area of the originating device.

21. The method of claim 8, further comprising:
establishing a communications link with the originating device by employing the received remote-paging response signal.

22. The method of claim 8, further comprising:
providing a communications for the originating device with the remote target device through the reserved communications channel.

23. The method of claim 8, wherein the address of the remote target device is a short-range communication address.

24. A method, comprising:
receiving a link creation signal with identifying information from an originating wireless access point at a remote wireless access point, wherein the identifying information includes originating device information, target device information, and originating wireless access point information;

sending a paging signal, for establishing a communications connection between the originating device and the target device, to the target device, wherein the paging signal includes at least an address of the target device, and wherein the target device is located beyond a coverage area of the originating device;

receiving a paging response signal from the target device;

establishing a wireless short-range communications link with the target device by employing the paging response signal;

sending a communication channel reservation signal to an originating wireless access point, wherein the reservation signal includes the paging response signal from the target device;

reserving a communications channel for the originating wireless access point by employing the received link creation signal, wherein the communications connection between the originating device and the target device is established, and wherein the communications connection comprises a wireless short-range connection between the originating device and the originating wireless access point, a wireless short-range connection between the target device and the remote wireless access point, and a direct connection between the originating wireless access point and the remote wireless access point.

25. The method of claim 24, wherein the remote target device would otherwise be unable to respond to the originating device.

26. The method of claim 24, wherein the remote target device is an Internet device.

27. The method of claim 24, wherein the remote access point information includes a remote access point address, and content.

28. The method of claim 27, the wherein the remote access point information further includes a communications port.

29. The method of claim 24, wherein the target device address is provided from the received link creation signal.

30. The method of claim 24, wherein the identifying information from the originating access point includes addresses.

31. The method of claim 30, wherein the addresses are Bluetooth addresses.

32. The method of claim 30, wherein the addresses are network addresses.

33. The method of claim 24, wherein the target device is outside a communication coverage area of the originating device.

34. The method of claim 24, wherein the target device is an Internet device.

35. The method of claim 24, wherein the reservation signal includes remote access point information.

36. The method of claim 24, wherein the target device is a Bluetooth enabled device and the short-range radio-frequency communication is Bluetooth communication.

37. The method of claim 24, wherein the address of the target device is a short-range communication address.

38. A method, comprising:
   receiving a routing database query at a central server to determine if a remote target device is present;
   if the central server is distributing wireless access point-to-wireless access point link creation, sending information responsive to the query to an originating wireless access point, wherein responsive information includes identifying information of a remote wireless access point;
   if the central server is itself handling link creation, sending a link creation signal to a remote wireless access point identified as a query result, wherein the link creation signal includes identifying information of an originating wireless access point,
   wherein a communications connection between an originating device and the remote target device is established, and wherein the communications connection comprises a wireless short-range connection between the originating device and the originating wireless access point, a wireless short-range connection between the remote target device and the remote wireless access point, and a direct connection between the originating wireless access point and the remote wireless access point.

39. The method of claim 38, wherein the target device is an Internet device.

40. The method of claim 38, wherein the identifying information includes originating device information.

41. The method of claim 38, wherein the identifying information includes target device information.

42. The method of claim 38, wherein the identifying information includes originating access point information.

43. The method of claim 38, further comprising:
   effecting the establishment of a communications link between the originating device and target device.

44. A system, comprising:
   means to send a remote paging signal to an originating wireless access point from an originating device over a wireless short-range communication link, wherein the remote paging signal is destined to a remote target device located beyond a coverage area of the originating device for establishing a communications connection between the originating device and the remote target device, wherein the remote paging signal includes at least an address of the remote target device;
   means to receive a paging response signal from the originating wireless access point over the wireless short-range communication link, wherein the paging response signal is effected from the remote target device; and
   means to establish, through the originating wireless access point and a remote wireless access point, the communications connection between the originating device and the remote target device,
   wherein the communications connection comprises a wireless short-range connection between the originating device and the originating wireless access point, a wireless short-range connection between the remote target device and the remote wireless access point, and a direct connection between the originating wireless access point and the remote wireless access point.

45. The system of claim 44, wherein the remote target device would otherwise be unable to respond to the originating device.

46. The system of claim 44, wherein the remote target device address is provided from a connectivity tool selection.

47. The system of claim 44, wherein the remote target device is outside a communication coverage area of the originating device.

48. The system of claim 44, wherein the remote target device is an Internet device.

49. The system of claim 44, wherein the establishment of a communications link with the remote target device includes establishing a communications link with the access point by employing the paging response signal.

50. The system of claim 44, wherein the address of the remote target device is a short-range communication address.

51. A system, comprising:
   means to receive a remote paging signal from an originating device over a wireless short-range communication link, wherein the remote paging signal is destined to a remote target device located beyond a coverage area of the originating device for establishing a communications connection between the originating device and the remote target device, wherein the remote paging signal includes at least an address of the remote target device;
   means to query a routing database to determine if the remote target device is present within a communication coverage area of an originating wireless access point;
   means to receive, from a central server distributing wireless access point-to-wireless access point link creation, identifying information of a remote wireless access point, and to send a link creation signal to the remote wireless access point;
   means to receive a communication channel reservation signal from the remote wireless access point, wherein the reservation signal includes remote wireless access point information, wherein the reservation signal includes a paging response signal from the wireless remote access point, wherein the paging response signal is effected from the remote target device;
   means to reserve a communications channel for the remote wireless access point by employing the remote wireless access point information received with the reservation signal;
   means to send a paging response signal to the originating device over the wireless short-range communication link, wherein the paging response signal is effected from the remote target device,
   wherein the communications connection between the originating device and the remote target device is established, and wherein the communications connection comprises a wireless short-range connection between the originating device and the originating wireless access point, a wireless short-range connection between the remote target device and the remote wireless access point, and a direct connection between the originating wireless access point and the remote wireless access point.

52. The system of claim 51, wherein the remote target device would otherwise be unable to respond to the originating device.

53. The system of claim 51, wherein the remote target device is an Internet device.

54. The system of claim 51, wherein the remote target device is outside a communication coverage area of the originating device.

55. The system of claim 51, wherein the remote target device address is provided from a connectivity tool selection.

56. The system of claim 51, wherein the routing database is in an access point.

57. The system of claim 51, wherein the routing database is accessible by a central server.

58. The system of claim 51, wherein the originating device is a Bluetooth enabled device and the short-range radio-frequency communication is Bluetooth communication.

59. The system of claim 51, wherein the identifying information is a Bluetooth address.

60. The system of claim 51, wherein the identifying information is a network address.

61. The system of claim 60, the wherein the remote access point information further includes a communications port.

62. The system of claim 51, wherein the remote access point information includes a remote access point address, and content.

63. The system of claim 51, wherein the remote target device is outside a communication coverage area of the originating device.

64. The system of claim 51, further comprising:
means to establish a communications link with the originating device by employing the received remote-paging response signal.

65. The system of claim 51, further comprising:
means to provide a communications for the originating device with the remote target device through the reserved communications channel.

66. The system of claim 51, wherein the address of the remote target device is a short-range communication address.

67. A system, comprising:
means to receive a link creation signal with identifying information from an originating wireless access point at a remote wireless access point, wherein the identifying information includes originating device information, target device information, and originating wireless access point information;
means to send a paging signal, for establishing a communications connection between the originating device and the target device, to the target device, wherein the paging signal includes at least an address of the target device, and wherein the target device is located beyond a coverage area of the originating device;
means to receive a paging response signal from the target device;
means to establish a wireless short-range communications link with the target device by employing the paging response signal;
means to send a communication channel reservation signal to an originating wireless access point, wherein the reservation signal includes the paging response signal from the target device;
means to reserve a communications channel for the originating wireless access point by employing the received link creation signal,
wherein the communications connection between the originating device and the target device is established, and wherein the communications connection comprises a wireless short-range connection between the originating device and the originating wireless access point, a wireless short-range connection between the target device and the remote wireless access point, and a direct connection between the originating wireless access point and the remote wireless access point.

68. The system of claim 67, wherein the remote target device would otherwise be unable to respond to the originating device.

69. The system of claim 67, wherein the remote target device is an Internet device.

70. The system of claim 67, wherein the remote access point information includes a remote access point address, and content.

71. The system of claim 70, the wherein the remote access point information further includes a communications port.

72. The system of claim 67, wherein the target device address is provided from the received link creation signal.

73. The system of claim 67, wherein the identifying information from the originating access point includes addresses.

74. The system of claim 73, wherein the addresses are Bluetooth addresses.

75. The system of claim 73, wherein the addresses are network addresses.

76. The system of claim 67, wherein the target device is outside a communication coverage area of the originating device.

77. The system of claim 67, wherein the target device is an Internet device.

78. The system of claim 67, wherein the reservation signal includes remote access point information.

79. The system of claim 67, wherein the target device is a Bluetooth enabled device and the short-range radio-frequency communication is Bluetooth communication.

80. The system of claim 67, wherein the address of the target device is a short-range communication address.

81. A system, comprising:
means to receive a routing database query at a central server to determine if a remote target device is present;
if the central server is distributing wireless access point-to-wireless access point link creation, means to send information responsive to the query to an originating wireless access point, wherein responsive information includes identifying information of a remote wireless access point;
if the central server is itself handling link creation, means to send a link creation signal to a remote wireless access point identified as a query result, wherein the link creation signal includes identifying information of an originating wireless access point,
wherein a communications connection between an originating device and the remote target device is established, and wherein the communications connection comprises a wireless short-range connection between the originating device and the originating wireless access point, a wireless short-range connection between the remote target device and the remote wireless access point, and a direct connection between the originating wireless access point and the remote wireless access point.

82. The system of claim 81, wherein the target device is an Internet device.

83. The system of claim 81, wherein the identifying information includes originating device information.

84. The system of claim 81, wherein the identifying information includes target device information.

85. The system of claim 81, wherein the identifying information includes originating access point information.

86. The system of claim 81, further comprising:
means to effect the establishment of a communications link between the originating device and target device.

87. An article of manufacture comprising a computer readable medium containing program code that when executed causes an apparatus to:
send a remote paging signal to an originating wireless access point from an originating device over a wireless short-range communication link, wherein the remote paging signal is destined to a remote target device located beyond a coverage area of the originating device for establishing a communications connection between the originating device and the remote target device, wherein the remote paging signal includes at least an address of the remote target device;

receive a paging response signal from the originating wireless access point over the wireless short-range communication link, wherein the paging response signal is effected from the remote target device; and establish, through the originating wireless access point and a remote wireless access point, the communications connection between the originating device and the remote target device, wherein the communications connection comprises a wireless short-range connection between the originating device and the originating wireless access point, a wireless short-range connection between the remote target device and the remote wireless access point, and a direct connection between the originating wireless access point and the remote wireless access point.

88. The article of manufacture of claim 87, wherein the remote target device would otherwise be unable to respond to the originating device.

89. The article of manufacture of claim 87, wherein the remote target device address is provided from a connectivity tool selection.

90. The article of manufacture of claim 87, wherein the remote target device is outside a communication coverage area of the originating device.

91. The article of manufacture of claim 87, wherein the remote target device is an Internet device.

92. The article of manufacture of claim 87, wherein the establishment of a communications link with the remote target device includes establishing a communications link with the access point by employing the paging response signal.

93. The article of manufacture of claim 87, wherein the address of the remote target device is a short-range communication address.

94. An article of manufacture comprising a computer readable medium containing program code that when executed causes an apparatus to:

receive a remote paging signal from an originating device over a wireless short-range communication link, wherein the remote paging signal is destined to a remote target device located beyond a coverage area of the originating device for establishing a communications connection between the originating device and the remote target device, wherein the remote paging signal includes at least an address of the remote target device;

query a routing database to determine if the remote target device is present within a communication coverage area of an wireless originating access point;

receive, from a central server distributing wireless access point-to-wireless access point link creation, identifying information of a remote wireless access point, and to send a link creation signal to the remote wireless access point;

receive a communication channel reservation signal from the remote wireless access point, wherein the reservation signal includes remote wireless access point information, wherein the reservation signal includes a paging response signal from the remote wireless access point, wherein the paging response signal is effected from the remote target device;

reserve a communications channel for the remote wireless access point by employing the remote wireless access point information received with the reservation signal;

send a paging response signal to the originating device over the wireless short-range communication link, wherein the paging response signal is effected from the remote target device, wherein the communications connection between the originating device and the remote target device is established, and wherein the communications connection comprises a wireless short-range connection between the originating device and the originating wireless access point, a wireless short-range connection between the remote target device and the remote wireless access point, and a direct connection between the originating wireless access point and the remote wireless access point.

95. The article of manufacture of claim 94, wherein the remote target device would otherwise be unable to respond to the originating device.

96. The article of manufacture of claim 94, wherein the remote target device is an Internet device.

97. The article of manufacture of claim 94, wherein the remote target device is outside a communication coverage area of the originating device.

98. The article of manufacture of claim 94, wherein the remote target device address is provided from a connectivity tool selection.

99. The article of manufacture of claim 94, wherein the routing database is in an access point.

100. The article of manufacture of claim 94, wherein the routing database is accessible by a central server.

101. The article of manufacture of claim 94, wherein the originating device is a Bluetooth enabled device and the short-range radio-frequency communication is Bluetooth communication.

102. The article of manufacture of claim 94, wherein the identifying information is a Bluetooth address.

103. The article of manufacture of claim 94, wherein the identifying information is a network address.

104. The article of manufacture of claim 103, the wherein the remote access point information further includes a communications port.

105. The article of manufacture of claim 94, wherein the remote access point information includes a remote access point address, and content.

106. The article of manufacture of claim 94, wherein the remote target device is outside a communication coverage area of the originating device.

107. The article of manufacture of claim 94, wherein the program code, when executed, further causes the apparatus to:

establish a communications link with the originating device by employing the received remote-paging response signal.

108. The article of manufacture of claim 94, wherein the program code, when executed, further causes the apparatus to:

provide a communications for the originating device with the remote target device through the reserved communications channel.

109. The article of manufacture of claim 94, wherein the address of the remote target device is a short-range communication address.

110. An article of manufacture comprising a computer readable medium containing program code that when executed causes an apparatus to:

receive a link creation signal with identifying information from an originating wireless access point at a remote wireless access point, wherein the identifying information includes originating device information, target device information, and originating wireless access point information;

send a paging signal, for establishing a communications connection between the originating device and the target device, to the target device, wherein the paging signal includes at least an address of the target device, and wherein the target device is located beyond a coverage area of the originating device;

receive a paging response signal from the target device;

establish a wireless short-range communications link with the target device by employing the paging response signal;

send a communication channel reservation signal to an originating wireless access point, wherein the reservation signal includes the paging response signal from the target device;

reserve a communications channel for the originating wireless access point by employing the received link creation signal, wherein the communications connection between the originating device and the target device is established, and wherein the communications connection comprises a wireless short-range connection between the originating device and the originating wireless access point, a wireless short-range connection between the target device and the remote wireless access point, and a direct connection between the originating wireless access point and the remote wireless access point.

111. The article of manufacture of claim 110, wherein the remote target device would otherwise be unable to respond to the originating device.

112. The article of manufacture of claim 110, wherein the remote target device is an Internet device.

113. The article of manufacture of claim 110, wherein the remote access point information includes a remote access point address, and content.

114. The article of manufacture of claim 113, the wherein the remote access point information further includes a communications port.

115. The article of manufacture of claim 110, wherein the target device address is provided from the received link creation signal.

116. The article of manufacture of claim 110, wherein the identifying information from the originating access point includes addresses.

117. The article of manufacture of claim 116, wherein the addresses are Bluetooth addresses.

118. The article of manufacture of claim 116, wherein the addresses are network addresses.

119. The article of manufacture of claim 110, wherein the target device is outside a communication coverage area of the originating device.

120. The article of manufacture of claim 110, wherein the target device is an Internet device.

121. The article of manufacture of claim 110, wherein the reservation signal includes remote access point information.

122. The article of manufacture of claim 110, wherein the target device is a Bluetooth enabled device and the short-range radio-frequency communication is Bluetooth communication.

123. The article of manufacture of claim 110, wherein the address of the target device is a short-range communication address.

124. An article of manufacture comprising a computer readable medium containing program code that when executed causes an apparatus to:

receive a routing database query at a central server to determine if a remote target device is present;

if the central server is distributing wireless access point-to-wireless access point link creation, send information responsive to the query to an originating wireless access point, wherein responsive information includes identifying information of a remote wireless access point;

if the central server is itself handling link creation, send a link creation signal to a remote wireless access point identified as a query result, wherein the link creation signal includes identifying information of an originating wireless access point, wherein a communications connection between an originating device and the remote target device is established, and wherein the communications connection comprises a wireless short-range connection between the originating device and the originating wireless access point, a wireless short-range connection between the remote target device and the remote wireless access point, and a direct connection between the originating wireless access point and the remote wireless access point.

125. The article of manufacture of claim 124, wherein the target device is an Internet device.

126. The article of manufacture of claim 124, wherein the identifying information includes originating device information.

127. The article of manufacture of claim 124, wherein the identifying information includes target device information.

128. The article of manufacture of claim 124, wherein the identifying information includes originating access point information.

129. The article of manufacture of claim 124, wherein the program code, when executed, further causes the apparatus to:

effect the establishment of a communications link between the originating device and target device.

130. An apparatus, comprising:

a memory, the memory for storing instructions;

a processor that may issue a plurality of processing instructions stored in the memory, wherein the instructions issue signals to:

send a remote paging signal to an originating wireless access point from an originating device over a wireless short-range communication link, wherein the remote paging signal is destined to a remote target device located beyond a coverage area of the originating device for establishing a communications connection between the originating device and the remote target device, wherein the remote paging signal includes at least an address of the remote target device;

receive a paging response signal from the originating wireless access point over the wireless short-range communication link, wherein the paging response signal is effected from the remote target device; and establish, through the originating wireless access point and a remote wireless access point, the communications connection between the originating device and the remote target device, wherein the communications connection comprises a wireless short-range connection between the originating device and the originating wireless access point, a wireless short-range connection between the remote target device and the remote wireless access point, and a direct connection between the originating wireless access point and the remote wireless access point.

131. The apparatus of claim 130, wherein the remote target device would otherwise be unable to respond to the originating device.

132. The apparatus of claim 130, wherein the remote target device address is provided from a connectivity tool selection.

133. The apparatus of claim 130, wherein the remote target device is outside a communication coverage area of the originating device.

134. The apparatus of claim 130, wherein the remote target device is an Internet device.

135. The apparatus of claim 130, wherein the establishment of a communications link with the remote target device includes establishing a communications link with the access point by employing the paging response signal.

136. The apparatus of claim 130, wherein the address of the remote target device is a short-range communication address.

137. An apparatus, comprising:
a memory, the memory for storing instructions;
a processor that may issue a plurality of processing instructions stored in the memory, wherein the instructions issue signals to:
receive a remote paging signal from an originating device over a wireless short-range communication link, wherein the remote paging signal is destined to a remote target device located beyond a coverage area of the originating device for establishing a communications connection between the originating device and the remote target device, wherein the remote paging signal includes at least an address of the remote target device;
query a routing database to determine if the remote target device is present within a communication coverage area of an originating wireless access point;
receive, from a central server distributing wireless access point-to-wireless access point link creation, identifying information of a remote wireless access point, and to send a link creation signal to the remote wireless access point;
receive a communication channel reservation signal from the remote wireless access point, wherein the reservation signal includes remote wireless access point information, wherein the reservation signal includes a paging response signal from the remote wireless access point, wherein the paging response signal is effected from the remote target device;
reserve a communications channel for the remote wireless access point by employing the remote wireless access point information received with the reservation signal;
send a paging response signal to the originating device over the wireless short-range communication link, wherein the paging response signal is effected from the remote target device,
wherein the communications connection between the originating device and the remote target device is established, and wherein the communications connection comprises a wireless short-range connection between the originating device and the originating wireless access point, a wireless short-range connection between the remote target device and the remote wireless access point, and a direct connection between the originating wireless access point and the remote wireless access point.

138. The apparatus of claim 137, wherein the remote target device would otherwise be unable to respond to the originating device.

139. The apparatus of claim 137, wherein the remote target device is an Internet device.

140. The apparatus of claim 137, wherein the remote target device is outside a communication coverage area of the originating device.

141. The apparatus of claim 137, wherein the remote target device address is provided from a connectivity tool selection.

142. The apparatus of claim 137, wherein the routing database is in an access point.

143. The apparatus of claim 137, wherein the routing database is accessible by a central server.

144. The apparatus of claim 137, wherein the originating device is a Bluetooth enabled device and the short-range radio-frequency communication is Bluetooth communication.

145. The apparatus of claim 137, wherein the identifying information is a Bluetooth address.

146. The apparatus of claim 137, wherein the identifying information is a network address.

147. The apparatus of claim 146, the wherein the remote access point information further includes a communications port.

148. The apparatus of claim 137, wherein the remote access point information includes a remote access point address, and content.

149. The apparatus of claim 137, wherein the remote target device is outside a communication coverage area of the originating device.

150. The apparatus of claim 137, further comprising instructions to issue signals to:
establish a communications link with the originating device by employing the received remote-paging response signal.

151. The apparatus of claim 137, further comprising instructions to issue signals to:
provide a communications for the originating device with the remote target device through the reserved communications channel.

152. The apparatus of claim 137, wherein the address of the remote target device is a short-range communication address.

153. An apparatus, comprising:
a memory, the memory for storing instructions;
a processor that may issue a plurality of processing instructions stored in the memory, wherein the instructions issue signals to:
receive a link creation signal with identifying information from an originating wireless access point at a remote wireless access point, wherein the identifying information includes originating device information, target device information, and originating wireless access point information;
send a paging signal, for establishing a communications connection between the originating device and the target device, to the target device, wherein the paging signal includes at least an address of the target device, and wherein the target device is located beyond a coverage area of the originating device;
receive a paging response signal from the target device;
establish a wireless short-range communications link with the target device by employing the paging response signal;
send a communication channel reservation signal to an originating wireless access point, wherein the reservation signal includes the paging response signal from the target device;
reserve a communications channel for the originating wireless access point by employing the received link creation signal, wherein the communications connection between the originating device and the target device is established, and wherein the communications connection comprises a wireless short-range connection between the originating device and the originating wireless access point, a wireless short-range connection between the target device and the remote wireless access point, and a direct connection between the originating wireless access point and the remote wireless access point.

154. The apparatus of claim 153, wherein the remote target device would otherwise be unable to respond to the originating device.

155. The apparatus of claim 153, wherein the remote target device is an Internet device.

156. The apparatus of claim 153, wherein the remote access point information includes a remote access point address, and content.

157. The apparatus of claim 156, the wherein the remote access point information further includes a communications port.

158. The apparatus of claim 153, wherein the target device address is provided from the received link creation signal.

159. The apparatus of claim 153, wherein the identifying information from the originating access point includes addresses.

160. The apparatus of claim 159, wherein the addresses are Bluetooth addresses.

161. The apparatus of claim 159, wherein the addresses are network addresses.

162. The apparatus of claim 153, wherein the target device is outside a communication coverage area of the originating device.

163. The apparatus of claim 153, wherein the target device is an Internet device.

164. The apparatus of claim 153, wherein the reservation signal includes remote access point information.

165. The apparatus of claim 153, wherein the target device is a Bluetooth enabled device and the short-range radio-frequency communication is Bluetooth communication.

166. The apparatus of claim 153, wherein the address of the target device is a short-range communication address.

167. An apparatus, comprising:
a memory, the memory for storing instructions;
a processor that may issue a plurality of processing instructions stored in the memory, wherein the instructions issue signals to:
 receive a routing database query at a central server to determine if a remote target device is present;
 if the central server is distributing wireless access point-to-wireless access point link creation, send information responsive to the query to an originating wireless access point, wherein responsive information includes identifying information of a remote wireless access point;
 if the central server is itself handling link creation, send a link creation signal to a remote wireless access point identified as a query result, wherein the link creation signal includes identifying information of an originating wireless access point,
 wherein a communications connection between an originating device and the remote target device is established, and wherein the communications connection comprises a wireless short-range connection between the originating device and the originating wireless access point, a wireless short-range connection between the remote target device and the remote wireless access point, and a direct connection between the originating wireless access point and the remote wireless access point.

168. The apparatus of claim 167, wherein the target device is an Internet device.

169. The apparatus of claim 167, wherein the identifying information includes originating device information.

170. The apparatus of claim 167, wherein the identifying information includes target device information.

171. The apparatus of claim 167, wherein the identifying information includes originating access point information.

172. The apparatus of claim 167, further comprising instructions to issue signals to:
 effect the establishment of a communications link between the originating device and target device.

* * * * *